United States Patent
Chung et al.

(10) Patent No.: US 11,743,967 B2
(45) Date of Patent: Aug. 29, 2023

(54) ELECTRONIC DEVICE FOR SUPPORTING DUAL CONNECTIVITY AND OPERATION METHOD THEREOF

(71) Applicant: Samsung Electronics Co., Ltd., Suwon-si (KR)

(72) Inventors: Wonsuk Chung, Suwon-si (KR); Sangho Lee, Suwon-si (KR); Jukwan Lee, Suwon-si (KR); Suyoung Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 576 days.

(21) Appl. No.: 16/971,122

(22) PCT Filed: Jul. 22, 2020

(86) PCT No.: PCT/KR2020/009680
§ 371 (c)(1),
(2) Date: Aug. 19, 2020

(87) PCT Pub. No.: WO2021/020804
PCT Pub. Date: Feb. 4, 2021

(65) Prior Publication Data
US 2023/0097437 A1    Mar. 30, 2023

(30) Foreign Application Priority Data

Jul. 31, 2019 (KR) .................. 10-2019-0093428

(51) Int. Cl.
*H04W 76/28* (2018.01)
*H04W 76/16* (2018.01)
(Continued)

(52) U.S. Cl.
CPC ............ *H04W 76/28* (2018.02); *H04W 88/06* (2013.01)

(58) Field of Classification Search
CPC ..... H04W 76/28; H04W 88/06; H04W 28/08; H04W 76/16; Y02D 30/70
(Continued)

(56) References Cited

U.S. PATENT DOCUMENTS

2011/0199951 A1   8/2011  Kwon et al.
2016/0165539 A1   6/2016  Yi et al.
(Continued)

FOREIGN PATENT DOCUMENTS

KR   10-2017-0003629 A   1/2017
WO   2017/034230 A1      3/2017

OTHER PUBLICATIONS

Noh et al., Standardization of 3GPP LTE and LTE-Advanced, Jun. 2008.
(Continued)

*Primary Examiner* — Inder P Mehra
(74) *Attorney, Agent, or Firm* — Jefferson IP Law, LLP

(57) ABSTRACT

An electronic device is provided. The electronic device includes a first communication processor configured to support first network communication with a first network, and a second communication processor configured to support second network communication with a second network, which is different from the first network. If both the first network communication and the second network communication are configured to be in a state capable of transmitting data, when the second communication processor is in a discontinuous reception (DRX) mode, the first communication processor is configured to identify an uplink packet to be transmitted and transmit the uplink packet using the first network communication, based on identifying that the second communication processor is in the DRX mode, and the second communication processor maintains the DRX mode, (Continued)

while the uplink packet is transmitted. Other various embodiments may be possible.

20 Claims, 19 Drawing Sheets

(51) Int. Cl.
*H04W 88/06* (2009.01)
*H04W 28/08* (2023.01)

(58) Field of Classification Search
USPC .......................................................... 370/328
See application file for complete search history.

(56) References Cited

U.S. PATENT DOCUMENTS

2017/0055187 A1   2/2017   Kang et al.
2018/0367230 A1   12/2018  Su et al.
2019/0159280 A1*  5/2019   Chakraborty ..... H04W 52/0235

OTHER PUBLICATIONS

International Search Report dated Oct. 21, 2020, issued in International Patent Application No. PCT/KR2020/009680.

* cited by examiner

ELECTRONIC DEVICE FOR SUPPORTING DUAL CONNECTIVITY AND OPERATION METHOD THEREOF

CROSS-REFERENCE TO RELATED APPLICATION(S)

This application is a U.S. National Stage application under 35 U.S.C. § 371 of an International application number PCT/KR2020/009680, filed on Jul. 22, 2020, which is based on and claimed priority of a Korean patent application number 10-2019-0093428, filed on Jul. 31, 2019, in the Korean Intellectual Property Office, the disclosure of which is incorporated by reference herein in its entirety.

TECHNICAL FIELD

The disclosure relates to an electronic device that supports dual connectivity, and an operation method thereof.

BACKGROUND ART

As mobile communication technologies have developed, portable terminals that provide various functions have become popular. Accordingly, efforts to develop a 5th generation (5G) communication system are being made in order to meet the increasing wireless data traffic demands. In order to achieve a high data transmission rate, implementation of the 5G communication system in a super-high frequency band is considered, in addition to implementation in a high frequency band which has been used by a 3rd generation (3G) communication system and a long term evolution (LTE) communication system, so as to provide a high data transmission speed.

As a method of implementing 5G communication, a standalone (SA) scheme and a non-standalone (NSA) scheme are considered. The NSA scheme may be a scheme of using a new radio (NR) system together with a legacy LTE system. In the NSA scheme, a user equipment (UE) may use an evolved node B (eNB) in an LTE system, and a next-generation node B (gNB) (or secondary gNB (SgNB)) in an NR system. A technology in which a UE enables different communication systems is referred to as dual connectivity.

Dual connectivity was suggested first by 3rd generation partnership project (3GPP) release-12. According to the first suggestion, dual connectivity that uses a 3.5 GHz frequency band as a small cell, in addition to an LTE system, was suggested. According to the NSA scheme of 5G, the dual connectivity suggested by 3GPP release-12 may be implemented in a manner of using an LTE system as a master node and an NR system as a secondary node.

A user equipment (UE) may configure a split bearer in a dual connectivity environment. The UE may configure the split bearer, based on information received from a base station. The split bearer may be configured for both a downlink (DL) and an uplink (UL). Alternatively, the split bearer may be configured for one of a DL and a UL. If the split bearer is configured for the UL, the UE may transmit data via at least one of a main cell group (MCG)-based path and a secondary cell group (SCG)-based path. If the split bearer is configured, the UE may set one of the MCG-based path and the SCG-based path as a primary path, and may set the other path as a secondary path. For example, if data that the UE desires to transmit is less than a threshold value (e.g., an uplink data split threshold value (ul-datasplitthreshold)), the UE may transmit the data to a base station via the primary path. In this instance, if a predetermined period of time (e.g., discontinuous reception (DRX) inactivity timer) elapses, a discontinuous reception (DRX) mode (e.g., connected mode discontinuous reception (CDRX) or idle mode discontinuous reception (IDRX)) may begin. In a DRX mode, the UE may wake up by a DRX cycle, so as to monitor a physical downlink control channel (PDCCH) during a predetermined period of time (e.g., on duration timer). In long term evolution (LTE), an electronic device may operate in a DRX mode in an RRC CONNECTED state and an RRC IDLE state. In new radio (NR), the electronic device may operate in a DRX mode in an RRC CONNECTED state, an RRC IDLE state, and an RRC INACTIVE state.

The above information is presented as background information only to assist with an understanding of the disclosure. No determination has been made, and no assertion is made, as to whether any of the above might be applicable as prior art with regard to the disclosure.

DISCLOSURE

Technical Problem

Aspects of the disclosure are to address at least the above-mentioned problems and/or disadvantages and to provide at least the advantages described below. Accordingly, an aspect of the disclosure is to provide an electronic device that supports dual connectivity, and an operation method thereof.

A user equipment (UE) that configures dual connectivity may set a downlink (DL) path and an uplink (UL) primary path to be different from each other. For example, the UE may set a first network communication as a DL path, and may set a second network communication as a UL primary path. Depending on the case, a timer for entering a discontinuous reception (DRX) state may expire in both the first network communication and the second network communication. An entity corresponding to the first network communication and an entity corresponding to the second network communication may wake up for a predetermined period of time (on-duration timer) by a DRX cycle, so as to monitor a physical downlink control channel (PDCCH). In order to receive DL data, the entity corresponding to the first network communication may need to change to an on-duration state from a battery saving state in the DRX mode. The battery saving state may be, for example, a state remaining after excluding the on-duration state (e.g., the other state except for the on-duration state in a DRX cycle), and may not monitor a PDCCH transmitted from a base station during the corresponding interval. For example, the battery saving state may be referred to as an "inactive state", "sleep state", or "off-duration state". Alternatively, in order to receive DL data, the UE may need to maintain an entity corresponding to the first network communication to remain in an on-duration state of the DRX mode. For example, in order to transmit UL data, which corresponds to DL data, an entity corresponding to the second network communication, in addition to the entity corresponding to the first network communication, may need to be changed to an on-duration state from a battery saving state of the DRX mode. Alternatively, in order to transmit UL data, which corresponds to DL data, the UE may need to maintain the entity corresponding to the second network communication to remain in the on-duration state of the DRX mode. In this instance, an uplink delay may be incurred due to the amount of time spent on waking up the entity of the second network communication, or the amount of power consumed for waking up the entity corresponding to the second network communication may be increased.

In accordance with an aspect of the disclosure, an electronic device and an operation method are provided. The electronic device and the operation method transmit UL data in a UL secondary path when the UL secondary path is in an activated state, if a UL primary path is identified as being in a state for monitoring a PDCCH by a designated cycle (e.g., a DRX mode) after a timer expires, in the state in which a split bearer is configured. Alternatively, an electronic device and an operation method according to various embodiments may transmit UL data via a UL secondary path when the UL secondary path is in an activated state, if the UL primary path is identified as being in a battery saving state of the DRX mode.

Technical Solution

Various respective aspects and features of the invention are defined in the appended claims. Combinations of features from the dependent claims may be combined with features of the independent claims as appropriate and not merely as explicitly set out in the claims.

Furthermore, one or more selected features of any one embodiment described in this disclosure may be combined with one or more selected features of any other embodiment described herein, provided that the alternative combination of features at least partially alleviates the one or more technical problem discussed in this disclosure or at least partially alleviates a technical problem discernable by the skilled person from this disclosure and further provided that the particular combination or permutation of embodiment features thus formed would not be understood by the skilled person to be incompatible.

Two or more physically distinct components in any described example implementation of this disclosure may alternatively be integrated into a single component where possible, provided that the same function is performed by the single component thus formed. Conversely, a single component of any embodiment described in this disclosure may alternatively be implemented as two or more distinct components to achieve the same function, where appropriate.

In accordance with another aspect of the disclosure, an electronic device is provided. The electronic device may include a first communication processor configured to support a first network communication with a first network, and a second communication processor configured to support a second network communication with a second network, which is different from the first network. If both the first network communication and the second network communication are configured to be in a state capable of transmitting data, when the second communication processor is in a DRX mode, the first communication processor is configured to identify an uplink packet to be transmitted and transmit the uplink packet using the first network communication, based on identifying that the second communication processor is in the DRX mode, and the second communication processor maintains the DRX mode, while the uplink packet is transmitted.

In accordance with another aspect of the disclosure, an operation method of a first communication processor that supports a first network communication with a first network is provided. The method may include if both the first network communication and a second network communication, which is different from the first network communication, and is supported by an electronic device including the communication processor, are configured to be in a state capable of transmitting data, receiving an uplink packet from an application processor, receiving information indicating that a second communication processor that supports the second network communication is in a DRX mode, and transmitting the uplink packet using the first network communication, based on identifying that the second communication processor is in the DRX mode.

In accordance with another aspect of the disclosure, an operation method of a communication processor is provided. The method may include maintaining a sleep state during a first period of time, and entering a DRX mode for performing PDCCH monitoring during a second period of time, in response to failure of detection of transmission/reception permission associated with transmission data and/or reception data in a PDCCH during a designated period of time, outputting information indicating that a state of the communication processor is the DRX mode, to the outside, in response to entry to the DRX mode, changing the state of the communication processor from the DRX mode to an activated state, based on detection of transmission/reception permission associated with transmission data and/or reception data according to a result of performing PDCCH monitoring during the second period of time of a DRX, and outputting information indicating that the state of the communication processor is the activated state, to the outside.

It is an aim of certain embodiments of the invention to solve, mitigate or obviate, at least partly, at least one of the problems and/or disadvantages associated with the prior art. Certain embodiments aim to provide at least one of the advantages described below.

Advantageous Effects

Accordingly, an aspect of the disclosure is to provide an electronic device and an operation method thereof, which can transmit UL data via a UL secondary path when the UL secondary path is in an activated state, if a UL primary path is identified as a state for monitoring a PDCCH during a predetermined period of time by a designated cycle, in the state in which a split bearer is configured. Accordingly, an uplink delay, which may be incurred due to the amount of time required for changing the state of an entity of the UL primary path to an activated state, may not be incurred, and the amount of power, which may be consumed for changing the state of the entity of the UL primary path to an activated state, may be saved.

Other aspects, advantages, and salient features of the disclosure will become apparent to those skilled in the art from the following detailed description, which, taken in conjunction with the annexed drawings, discloses various embodiments of the disclosure.

MODE FOR INVENTION

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
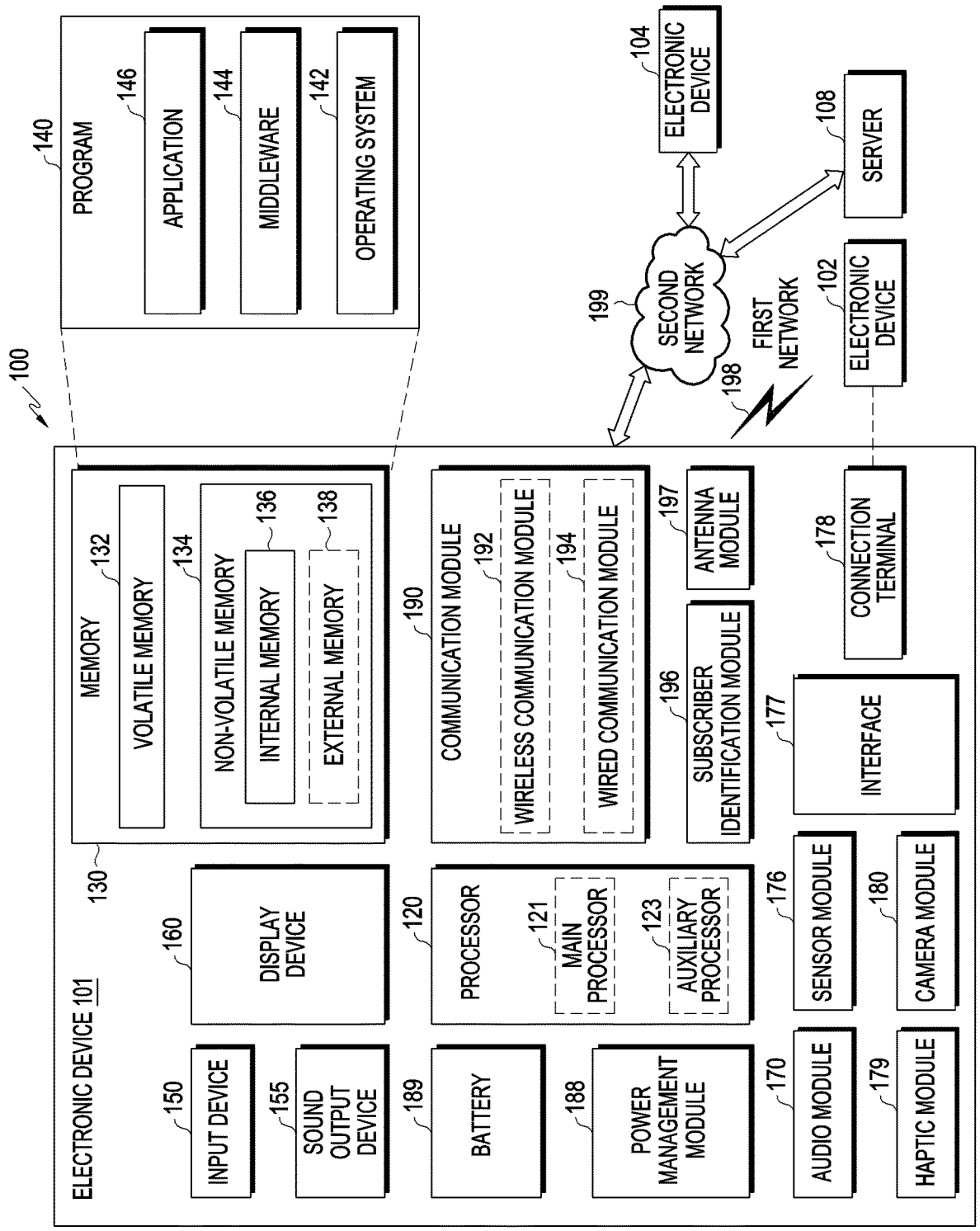
FIG. 1 is a block diagram illustrating an electronic device in a network environment according to an embodiment of the disclosure.

FIG. 1 is a block diagram illustrating an electronic device 101 in a network environment 100 according to an embodiment of the disclosure. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control, for example, at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active (e.g., executing an application) state. According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or an external electronic device (e.g., an electronic device 102 (e.g., a speaker or a headphone)) directly or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., printed circuit board (PCB)). According to an embodiment, the antenna module 197 may include a plurality of antennas. In such a case, at least one antenna appropriate for a communication scheme used in the communication network, such as the first network 198 or the second network 199, may be selected, for example, by the communication module 190 from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2A:
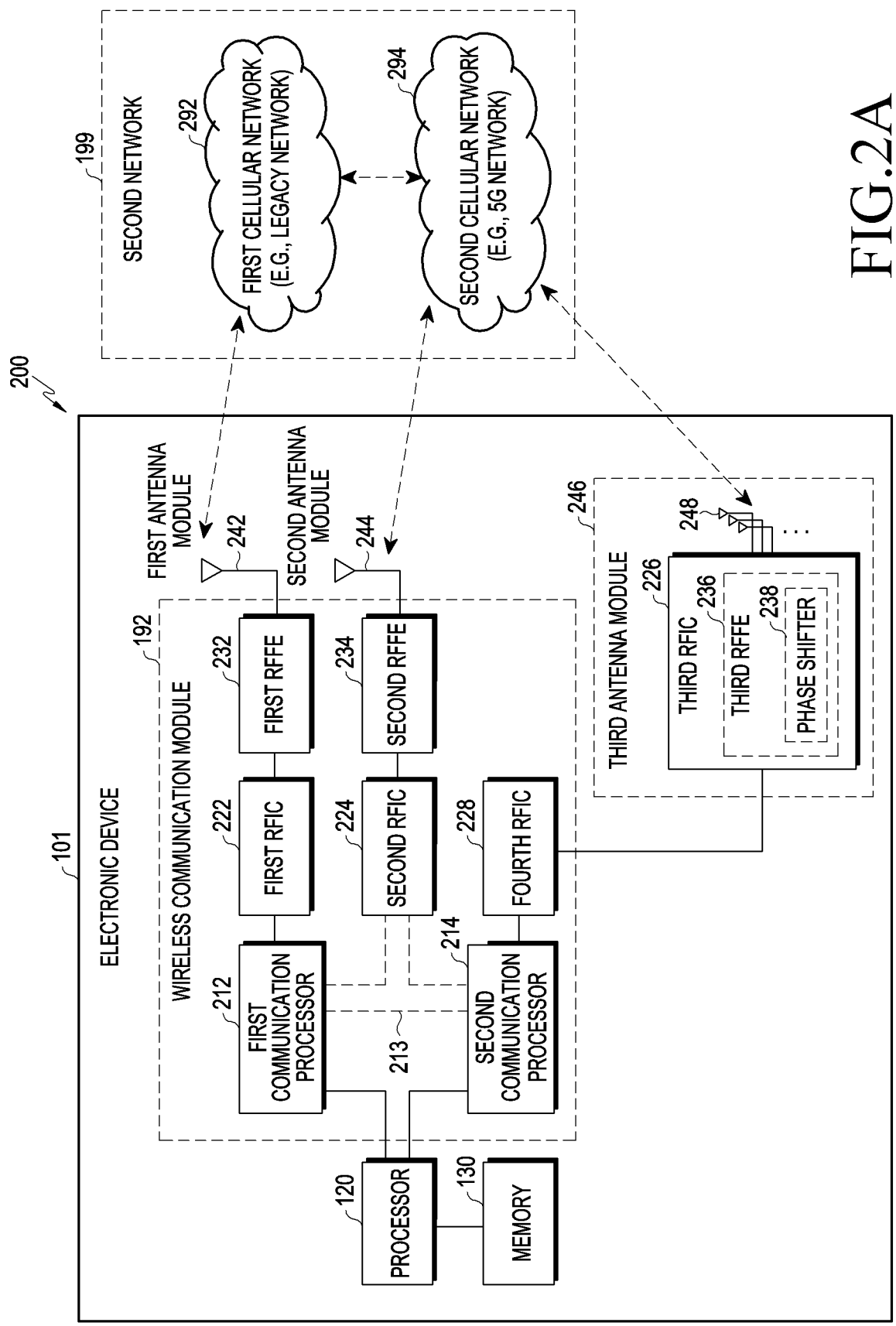
FIG. 2A is a block diagram of an electronic device for supporting network communication and 5th generation (5G) network communication according to an embodiment of the disclosure.

FIG. 2A is a block diagram 200 of electronic device 101 for supporting network communication and 5G network communication according to an embodiment of the disclosure. Referring to FIG. 2A, the electronic device 101 may include a first communication processor 212, a second communication processor 214, a first radio frequency integrated circuit (RFIC) 222, a second RFIC 224, a third RFIC 226, a fourth RFIC 228, a first radio frequency front end (RFFE) 232, a second RFFE 234, a first antenna module 242, a second antenna module 244, and an antenna 248. The electronic device 101 may further include the processor 120 and the memory 130. The second network 199 may include a first network 292 and a second network 294. According to another embodiment, the electronic device 101 may further include at least one component among the components illustrated in FIG. 1, and the network 199 may further include at least one other network. According to an embodiment, the first communication processor 212, the second communication processor 214, the first RFIC 222, the second RFIC 224, the fourth RFIC 228, the first RFFE 232, and the second RFFE 234 may be at least a part of the wireless communication module 192. According to another embodiment, the fourth RFIC 228 may be omitted, or may be included as a part of the third RFIC 226.

The first communication processor 212 may establish a communication channel of a band to be used for wireless communication with the first network 292, and may support legacy network communication via the established communication channel. According to various embodiments, the first network may be a legacy network including $2^{nd}$ generation (2G), $3^{rd}$ generation (3G), $4^{th}$ generation (4G), or long term evolution (LTE) network. The second communication processor 214 may establish a communication channel corresponding to a designated band (e.g., approximately 6 GHz to 60 GHz) among bands to be used for wireless communication with the second network 294, and may support 5G network communication via the established communication channel. According to various embodiments, the second network 294 may be a 5G network defined in 3GPP. Additionally, according to an embodiment, the first communication processor 212 or the second communication processor 214 may establish a communication channel corresponding to another designated band (e.g., 6 GHz or less) among bands to be used for wireless communication with the second network 294, and may support 5G network communication via the established channel.

The first communication processor 212 may perform data transmission or reception with the second communication processor 214. For example, data, which has been classified to be transmitted via the second cellular network 294, may be changed to be transmitted via the first cellular network 292. In this instance, the first communication processor 212 may receive transmission data from the second communication processor 214.

For example, the first communication processor 212 may perform data transmission or reception with the second communication processor 214 via an inter-processor interface 213. The inter-processor interface 213 may be implemented as, for example, a universal asynchronous receiver/transmitter (UART) (e.g., a high speed-UART (HS-UART) or a peripheral component interconnect bus express (PCIe), but the type of interface is not limited. Alternatively, the first communication processor 212 and the second communication processor 214 may exchange control information and packet data information using, for example, a shared memory. The first communication processor 212 may perform transmission or reception of various types of information, such as sensing information, information associated with an output strength, and resource block (RB) allocation information, with the second communication processor 214.

Depending on the implementation, the first communication processor 212 may not be directly connected to the second communication processor 214. In this instance, the first communication processor 212 may perform data transmission or reception with the second communication processor 214, via the processor 120 (e.g., an application processor). For example, the first communication processor 212 and the second communication processor 214 may perform data transmission or reception with the processor 120 (e.g., an application processor) via a HS-UART interface or a PCIe interface, but the type of interface is not limited. Alternatively, the first communication processor 212 and the second communication processor 214 may exchange control information and packet data information with the processor 120 (e.g., an application processor) using a shared memory.

According to an embodiment, the first communication processor 212 and the second communication processor 214 may be implemented in a single chip or a single package. According to various embodiments, the first communication processor 212 or the second communication processor 214 may be implemented in a single chip or a single package, together with the processor 120, the sub-processor 123, or the communication module 190. For example, as illustrated in FIG. 2B, an integrated communication processor 260 may support both a function for communication with a first cellular network and a function for communication with a second cellular network.

Figure 2B:
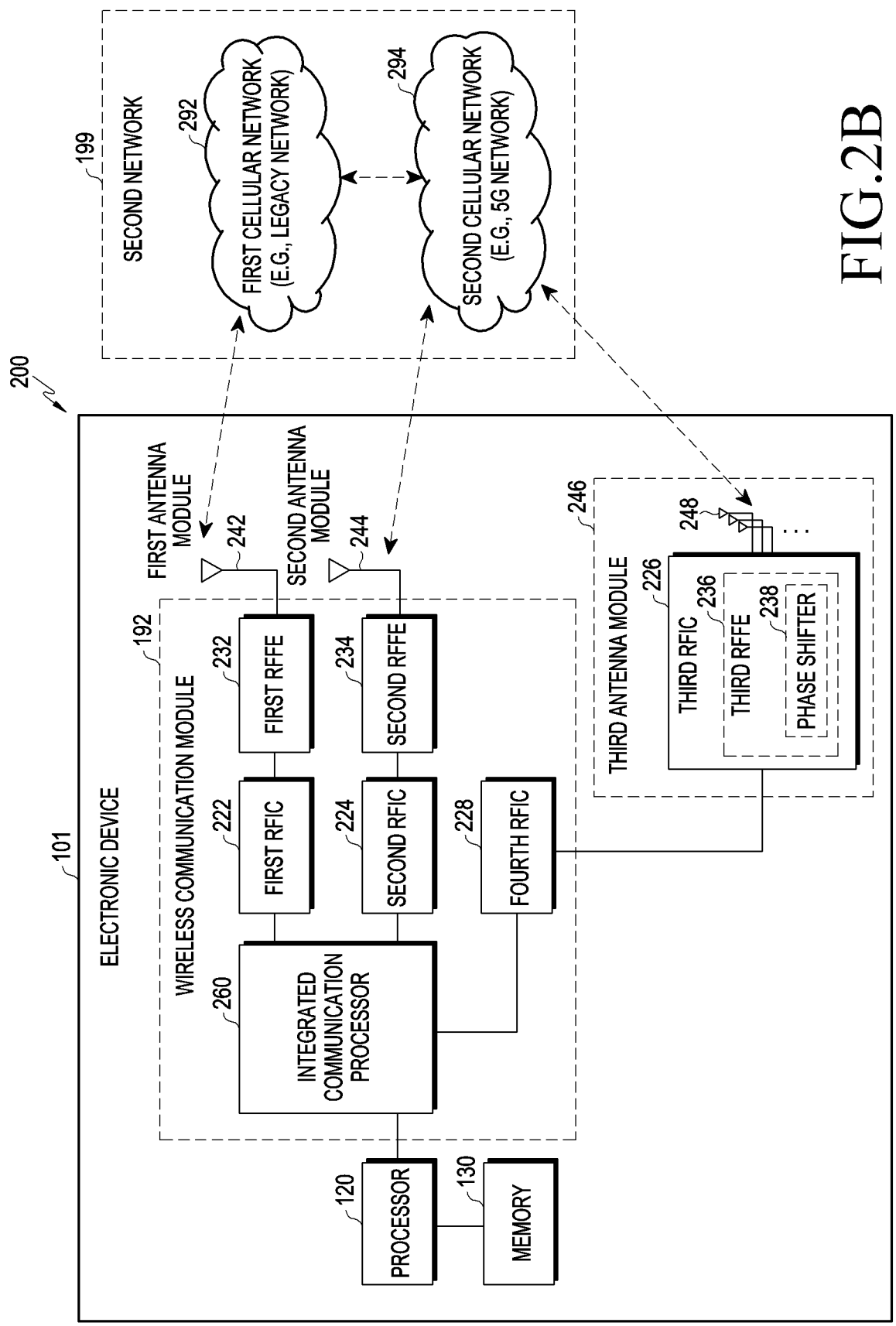
FIG. 2B is a block diagram of an electronic device for supporting network communication and 5G network communication according to an embodiment of the disclosure.

FIG. 2B is a block diagram of an electronic device for supporting network communication and 5G network communication according to an embodiment of the disclosure.

Referring to FIG. 2B, in the case of transmission, the first RFIC 222 may convert a baseband signal generated by the first communication processor 212 into a radio frequency (RF) signal in the range of approximately 700 MHz to 3 GHz, which is used in the first network 292 (e.g., a legacy network). In the case of reception, an RF signal is obtained from the first network 292 (e.g., a legacy network) via an antenna (e.g., the first antenna module 242), and may be pre-processed via an RFFE (e.g., the first RFFE 232). The first RFIC 222 may convert the preprocessed RF signal into a baseband signal so that the signal may be processed by the first communication processor 212.

In the case of transmission, the second RFIC 224 may convert a baseband signal generated by the first communication processor 212 or the second communication processor 214 into an RF signal (hereinafter, a 5G Sub6 RF signal) in an Sub6 band (e.g., approximately 6 GHz or less) used in the second network 294 (e.g., a 5G network). In the case of reception, a 5G Sub6 RF signal is obtained from the second network 294 (e.g., a 5G network) via an antenna (e.g., the second antenna module 244), and may be preprocessed by an RFFE (e.g., the second RFFE 234). The second RFIC 224 may convert the preprocessed 5G Sub6 RF signal into a baseband signal so that the signal may be processed by a corresponding communication processor from among the first communication processor 212 or the second communication processor 214.

The third RFIC 226 may convert a baseband signal generated by the second communication processor 214 into an RF signal (hereinafter, a 5G Above6 RF signal) of a 5G Above6 band (e.g., approximately 6 GHz to 60 GHz) to be used in the second network 294 (e.g., a 5G network). In the case of reception, a 5G Above6 RF signal is received from the second network 294 (e.g., a 5G network) via an antenna (e.g., the antenna 248), and may be preprocessed by a third RFFE 236. The third RFIC 226 may convert the preprocessed 5G Above6 RF signal into a baseband signal so that the signal may be processed by the second communication processor 214. According to an embodiment, the third RFFE 236 may be implemented as a part of the third RFIC 226.

The electronic device 101, according to an embodiment, may include the fourth RFIC 228, separately from the third RFIC 226 or as a part of the third RFIC 226. In this instance, the fourth RFIC 228 may convert the baseband signal generated by the second communication processor 214 into an RF signal (hereinafter, an IF signal) in an intermediate frequency band (e.g., approximately 9 GHz to 11 GHz), and may transfer the IF signal to the third RFIC 226. The third RFIC 226 may convert the IF signal into a 5G Above6 RF signal. In the case of reception, a 5G Above6 RF signal may be received from the second network 294 (e.g., a 5G network) via an antenna (e.g., the antenna 248), and may be converted into an IF signal by the third RFFE 226. The fourth RFIC 228 may convert the IF signal into a baseband signal so that the second communication processor 214 may process the signal.

According to an embodiment, the first RFIC 222 and the second RFIC 224 may be implemented as at least a part of a single chip or single package. According to an embodiment, the first RFFE 232 and the second RFFE 234 may be implemented as at least a part of a single chip or single package. According to an embodiment, at least one of the first antenna module 242 or the second antenna module 244 may be omitted or may be combined with another antenna module, so as to process RF signals of a plurality of corresponding bands.

According to an embodiment, the third RFIC 226 and the antenna 248 may be disposed in the same substrate, and may form a third antenna module 246. For example, the wireless communication module 192 or the processor 120 may be disposed in a first substrate (e.g., main PCB). In this instance, the third RFIC 226 is disposed on a part (e.g., a lower part) of a second substrate (e.g., a sub PCB) different from the first substrate, and the antenna 248 is disposed on another part (e.g., an upper part), so that the third antenna module 246 is formed. By disposing the third RFIC 226 and the antenna 248 in the same substrate, the length of a transmission line therebetween may be reduced. For example, this may reduce a loss (e.g., attenuation) of a high-frequency band signal (e.g., approximate 6 GHz to 60 GHz) used for 5G network communication, the loss being caused by a transmission line. Accordingly, the electronic device 101 may improve the quality or speed of communication with the second network 294 (e.g., a 5G network).

According to an embodiment, the antenna 248 may be implemented as an antenna array including a plurality of antenna elements which may be used for beamforming. In this instance, the third RFIC 226, for example, may include a plurality of phase shifters 238 corresponding to a plurality of antenna elements, as a part of the third RFFE 236. In the case of transmission, each of the plurality of phase shifters 238 may shift the phase of a 5G Above6 RF signal to be transmitted to the outside of the electronic device 101 (e.g., a base station of a 5G network) via a corresponding antenna element. In the case of reception, each of the plurality of phase shifters 238 may shift the phase of a 5G Above6 RF signal received from the outside via a corresponding antenna element into the same or substantially the same phase. This may enable transmission or reception via beamforming between the electronic device 101 and the outside.

The second network 294 (e.g., a 5G network) may operate independently (e.g., Standalone (SA)) from the first network 292 (e.g., a legacy network), or may operate by being connected thereto (e.g., Non-Standalone (NSA)). For example, in the 5G network, only an access network (e.g., a 5G radio access network (RAN) or next generation RAN (NG RAN)) may be present, and a core network (e.g., a next generation core (NGC)) may not be present. In this instance, the electronic device 101 may access the access network of the 5G network, and may access an external network (e.g., the Internet) under the control of a core network (e.g., an evolved packed core (EPC)) of the legacy network. Protocol information (e.g., LTE protocol information) for communication with the legacy network or protocol information (e.g., new radio (NR) protocol information) for communication with the 5G network may be stored in the memory 230, and may be accessed by another component (e.g., the processor 120, the first communication processor 212, or the second communication processor 214).

Figure 3:
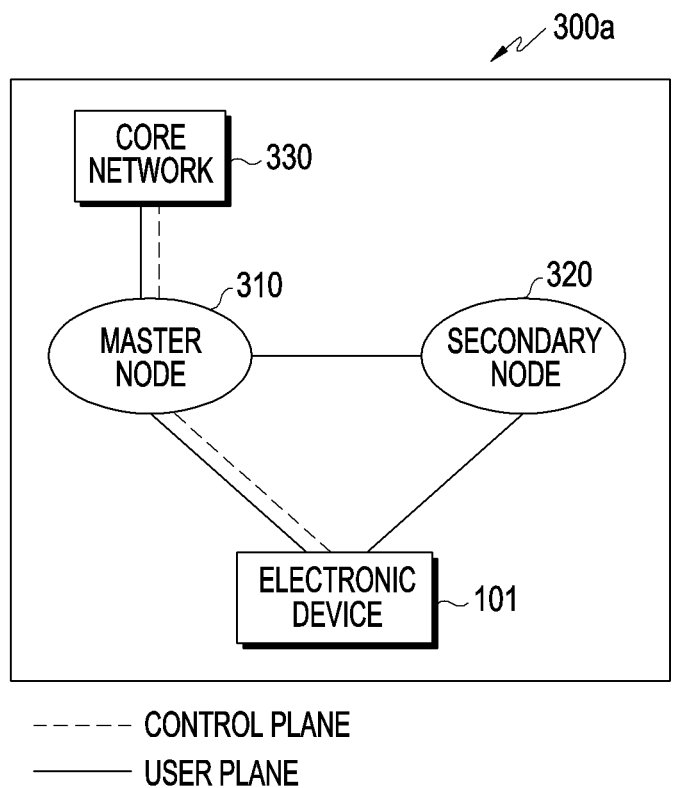
FIG. 3 is a diagram illustrating wireless communication systems that provide a legacy communication network and/or a 5G communication network according to an embodiment of the disclosure.

FIG. 3 is a diagram illustrating wireless communication systems that provide a legacy communication network and/or a 5G communication network according to an embodiment of the disclosure. Referring to FIG. 3, a network environment 300a may include at least one of a legacy network and a 5G network. The legacy network, for example, may include a 3GPP standard-based 4G or first base station (e.g., an eNodeB (eNB)) that supports radio access to the electronic device 101, and an evolved packet core (EPC) that manages 4G communication. The 5G network, for example, may include a new radio (NR) base station (e.g., a gNodeB (gNB)) that supports radio access to the electronic device 101 and a $5^{th}$ generation core (5GC) that manages 5G communication of the electronic device 101.

According to various embodiments, the electronic device 101 may transmit or receive a control message and user data via legacy communication and/or 5G communication. The control message, for example, may include a message related to at least one of security control, bearer setup, authentication, registration, or mobility management in association with the electronic device 101. The user data, for example, may be user data, excluding a control message transmitted or received between the electronic device 101 and a core network 330 (e.g., an EPC).

Referring to FIG. 3, the electronic device 101 according to an embodiment may perform transmission or reception of at least one of a control message or user data with at least a part of the 5G network (e.g., an NR base station or a 5GC), using at least a part of the legacy network (e.g., an LTE base station or an EPC).

According to various embodiments, the network environment 300a may include a network environment that provides a wireless communication dual connectivity (DC) to an LTE base station and an NR base station, and performs transmission or reception of a control message with the electronic device 101 via the core network 330 corresponding to one of the EPC or 5GC.

According to various embodiments, in a DC environment, one of an LTE base station or an NR base station may operate as a master node (MN) 310, and the other may operate as a secondary node (SN) 320. The MN 310 may be connected to the core network 330, and may transmit or receive a control message. The MN 310 and the SN 320 are connected via a network interface, and may perform transmission or reception of a message related radio resource management (e.g., a communication channel) therebetween.

According to various embodiments, the MN 310 may be implemented as the first base station, the SN 320 may be implemented as an NR base station, and the core network 330 may be implemented as an EPC. For example, a control message may be transmitted or received via the LTE base station and the EPC, and user data may be transmitted or received via at least one of the LTE base station or NR base station.

According to various embodiments, the MN 310 may be implemented as an NR base station, the SN 320 may be implemented as an LTE base station, and the core network 330 may be implemented as a 5GC. For example, a control message may be transmitted or received via the NR base station and the 5GC, and user data may be transmitted or received via at least one of the LTE base station or NR base station.

According to various embodiments, the electronic device 101 may be registered with at least one of the EPC or 5GC, and may transmit or receive a control message.

According to various embodiments, the EPC or 5GC may interwork, so as to manage communication of the electronic device 101. For example, the movement information of the electronic device 101 may be transmitted or received via an interface between the EPC and the 5GC.

As described above, dual connectivity via an LTE base station and an NR base station may be referred to as E-UTRA new radio dual connectivity (EN-DC). MR DC may be applicable in various ways, in addition to the EN-DC. For example, both a first network and a second network based on MR DC may be related to LTE communication, and the second network may be a network corresponding to a small cell of a predetermined frequency. For example, a first network may be a network that is connected to a 5G core network but uses an LTE communication-based wireless area, and a second network may be a network related to 5G communication. For example, both a first network and a second network based on the MR DC may be related to 5G, the first network may correspond to a frequency band less than 6 GHz (e.g., below 6), and the second network may correspond to a frequency band greater than or equal to 6 GHz (e.g., over 6). In addition to the above-described examples, those skilled in the art may easily understand that a network structure to which dual connectivity is applicable is also applicable to various embodiments.

Figure 4:
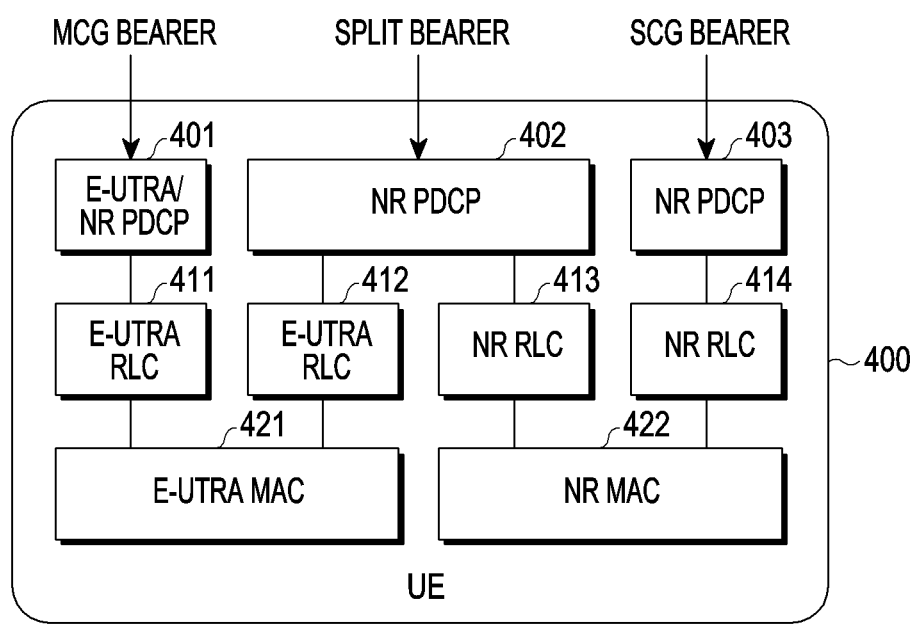
FIG. 4 is a diagram illustrating a bearer in a user equipment (UE) according to an embodiment of the disclosure.

FIG. 4 is a diagram illustrating a bearer in a UE according to an embodiment of the disclosure.

Referring to FIG. 4, according to various embodiments, a bearer which is available in a 5G non-standalone network environment (e.g., the network environment 300a of FIG. 3) may include a master cell group (MCG) bearer, a secondary cell group (SCG) bearer, and a split bearer. A user equipment (UE) 400 may be configured with an E-UTRA/NR packet data convergence protocol (PDCP) entity 401, and NR PDCP entities 402 and 403. The UE 400 may be configured with E-UTRA radio link control (RLC) entities 411 and 412 and NR RLC entities 413 and 414. The UE 400 may be configured with an E-UTRA medium access control (MAC) entity 421 and an NR MAC entity 422. The UE may be a user equipment that is capable of performing communication with a base station, and may be interchangeably used with the electronic device 101 of FIG. 1. For example, in various embodiments, the fact that a UE performs a predetermined operation may mean that at least one element included in the electronic device 101 performs a predetermined operation.

According to various embodiments, an MCG, for example, may correspond to a main node (MN) 310 of FIG. 3, and an SCG may correspond to a secondary node (SN) 320 of FIG. 3. The UE 400 may configure various entities illustrated in FIG. 4 for communication with a determined node (e.g., a base station), if a node for communication is determined. The entities 401, 402, and 403 in a PDCP layer may receive data (e.g., a PDCP service data unit (SDU) corresponding to an internet protocol (IP) packet), and may output converted data (e.g., a PDCP protocol data unit (PDU)) to which additional information (e.g., header information) is applied. The entities 411, 412, 413, and 414 in an RLC layer may receive the converted data (e.g., the PDCP PDU) output from the entities 401, 402, and 403 in the PDCP layer, and may output converted data (e.g., an RLC PDU) to which additional information (e.g., header information) is applied. The entities 421 and 422 in a MAC layer may receive the converted data (e.g., the RLC PDU) output from the entities 411, 412, 413, and 414 in the RLC layer, may output converted data (e.g., a MAC PDU) to which additional information (e.g., header information) is applied, and may transfer the same to a physical layer (not illustrated).

According to various embodiments, the MCG bearer may be associated with a path (or data) via which data is transmitted or received using only an entity or resource corresponding to an MN, in dual connectivity. The SCG bearer may be associated with a path (or data) via which data is transmitted or received using only a resource or entity corresponding to an SN, in dual connectivity. The split bearer may be associated with a path (or data) via which data is transmitted or received using a resource or entity corresponding to a MN or a resource or entity corresponding to an SN, in dual connectivity. Accordingly, as illustrated in FIG. 4, the split bearer may be associated with all of the E-UTRA RLC entity 412 and the NR RLC entity 413, and the E-UTRA MAC entity 421 and the NR MAC entity 422, via the NR PDCP entity 402.

Figure 5A:
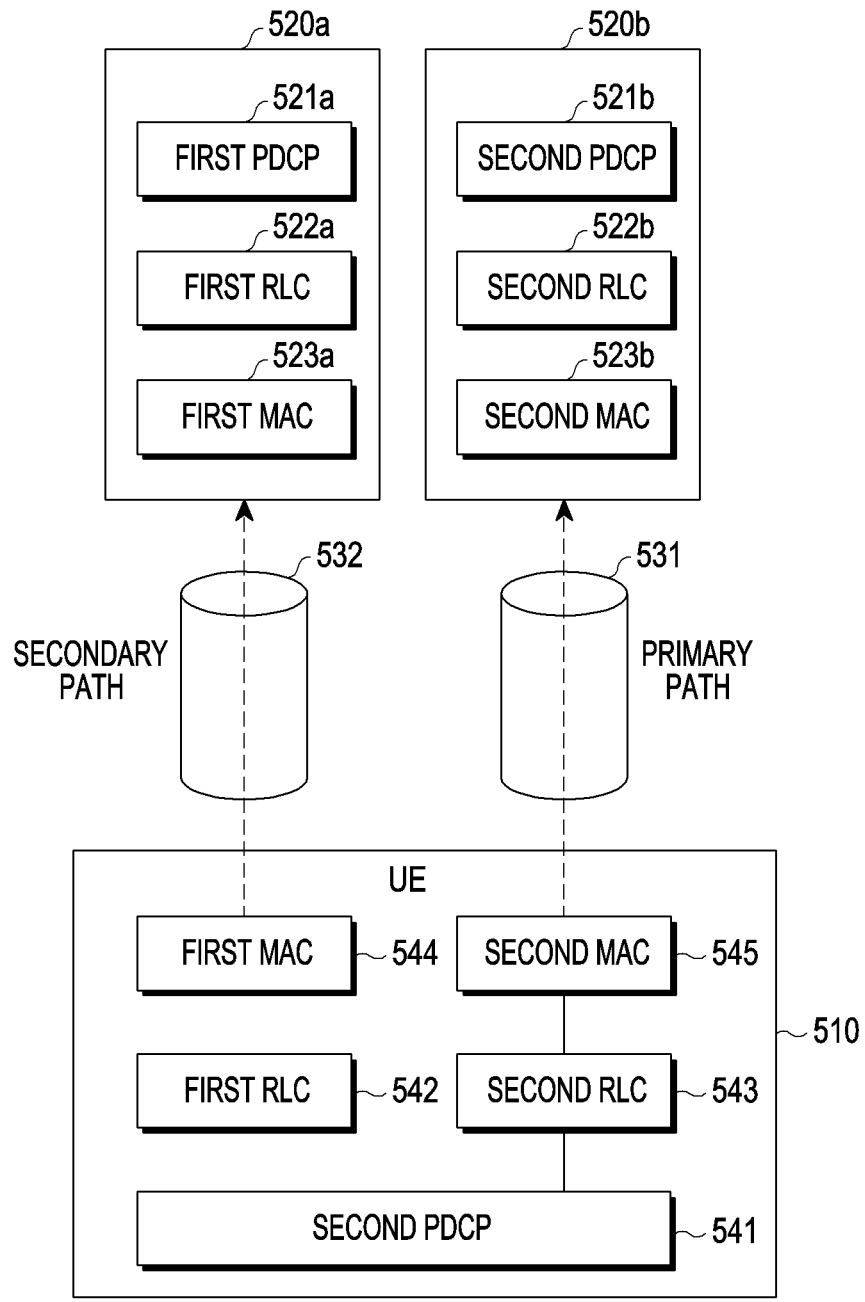
FIG. 5A is a diagram illustrating uplink paths between a UE and base stations (BS) according to an embodiment of the disclosure.

FIG. 5A is a diagram illustrating uplink paths between a UE and base stations according to an embodiment of the disclosure.

Referring to FIG. 5A, a UE 510 (e.g., the electronic device 101) according to various embodiments may perform communication with first and second base stations (BS) 520a and 520b, based on a split bearer. Since the split bearer is configured, the electronic device 101 may be in a state of being capable of transmitting uplink data via two types of network communication, as described above. Accordingly, transmission data (e.g., IP packets) that is to be transmitted from the UE 510 to the first and second base stations 520a and 520b may be transferred to a second RLC entity 543 and a second MAC entity 545, or to a first RLC entity 542 and a first MAC entity 544, via a second PDCP entity 541. For example, the first RLC entity 542 and the first MAC entity 544 may be associated with a first network. The second RLC entity 543 and the second MAC entity 545 may be associated with a second network. The first BS 520a may configure a first PDCP entity 521a, a first RLC entity 522a, and a first MAC entity 523a. The second BS 520b may configure a second PDCP entity 521b, a second RLC entity 522b, and a second MAC entity 523b. A path that is associated with the second RCL entity 543 and the second MAC entity 545 of the UE 510 may be a primary path 531. A path that is associated with the first RLC entity 542 and the first MAC entity 544 may be a secondary path 532. Here, the first PDCP entity 521a may be implemented to be identical to the secondary PDCP entity 521b. For example, in order to implement EN-DC, if the first BS 520a is an LTE BS, the first PDCP entity 521a may be configured as an NR PDCP entity. According to various embodiments of the disclosure, a predetermined PDCP entity (e.g., an NR PDCP entity) for a split bearer operation may be included in the first BS 520a. According to various embodiments of the disclosure, a predetermined PDCP entity (e.g., an NR PDCP entity) for a split bearer operation may be included in the BS 520b. In addition, a predetermined PDCP entity (e.g., an NR PDCP entity) for a split bearer operation may be included in the first BS 520a and the second BS 520b. According to various embodiments, implementation is performed so that only one of the first PDCP entity 521a and the second PDCP entity 521b operates. If a split bearer is configured, at least one of the first PDCP entity 521a or the second PDCP entity 521b may transmit data to a core network. According to various embodiments, one of the first PDCP entity 521a or the second PDCP entity 521b may not be present. The first BS 520a and the second BS 520b may directly communicate with each other. According to various embodiments, the first PDCP entity 521a may directly communicate with the second RLC 522b. According to various embodiments, the second PDCP entity 521b may directly communicate with the first RLC 522a.

According to various embodiments, networks that are available for dual connectivity may be used as a first network and a second network, without restriction. For example, a first network and a second network may correspond to LTE communication and NR communication, respectively. For example, both a first network and a second network are related to LTE communication, and the second network may be a network corresponding to a small cell of a predetermined frequency. For example, both a first network and a second network may be related to 5G, the first network may correspond to a frequency band less than 6 GHz (e.g., below 6), and the second network may correspond to a frequency band greater than or equal to 6 GHz (e.g., over 6). For example, the first BS 520a for the first network and the second BS 520b for the second network may be included in a single physical device.

The UE 510 according to various embodiments may transmit transmission data to the first and second BSs 520a and 520b based on a split bearer, using at least one of the first network and the second network. The UE 510 according to various embodiments may set the second network associated with the second BS 520b corresponding to an SCG as a primary path 531. The UE 510 may set the first network associated with the first BS 520a corresponding to an MCG as a secondary path 532. For example, the UE 510 may set the second network associated with an SCG as the primary path 531, based on information that indicates a primary path and is received from an MN. The information that indicates a primary path and is received from the MN may be included in a radio resource control (RRC) signal (e.g., RRC connection reconfiguration). According to another embodiment, the scheme in which the UE 510 sets a primary path is not limited. A primary path may be determined, for example, based on the policy of each communication operator. The UE 510 may receive information indicating a primary path, and may identify the primary path. A primary path may indicate a cell group identification (ID) and a logical channel ID (LCID) of a primary RLC entity for uplink data transmission, when a PDCP entity is associated with more than one RLC entity. The second PDCP entity 521b may be included in the BS 520b that has a primary path. According to various embodiments of the disclosure, the first PDCP entity 521a may be included in the first BS 520a that has a secondary path.

According to various embodiments, the UE 510 may identify information associated with an uplink-data split threshold value (ul-datasplitthreshold). The UE 510 may receive information associated with an uplink split threshold value from the MN, and may identify the same. The information associated with an uplink split threshold value may be included in a UE-specific or UE-dedicated RRC signal (e.g., RRC connection reconfiguration). According to various embodiments, the scheme in which the UE 510 identifies information associated with an uplink split threshold value is not limited.

Table 1 provided below is at least a part of an RRC connection reconfiguration message according to various embodiments.

TABLE 1

RRC connection reconfiguration-IEs ::= SEQUENCE { radioBearerConfig RadioBearerConfig OPTIONAL, -- Need M OPTIONAL, -- Need
MRadioBearerConfig ::= SEQUENCE {... drb-ToAddModList DRB-ToAddModList OPTIONAL, -- Need N ...}DRB-ToAddModList ::= SEQUENCE (SIZE (1..maxDRB)) OF DRB-ToAddMod DRB-ToAddMod ::=
SEQUENCE {... pdcp-Config PDCP-Config OPTIONAL, -- Cond PDCP ...}
PDCP-Config ::= SEQUENCE {drb SEQUENCE {...moreThanOneRLC SEQUENCE {primaryPath SEQUENCE {cellGroup CellGroupId OPTIONAL,
-- Need RlogicalChannel LogicalChannelIdentity OPTIONAL-- Need R},
ul-DataSplitThreshold OPTIONAL, -- Cond SplitBearer
pdcp-Duplication ENUMERATED { true } OPTIONAL -- Need R}

As marked by the underline, "ul-datasplitthreshold" is defined as an uplink split threshold value in the RRC connection reconfiguration message.

According to various embodiments, information associated with an uplink split threshold value may also be determined, for example, based on the policy of each communication operator. The UE 510 may identify that a transmission PDCP entity (transmitting PDCP entity) (e.g., the second PDCP entity 541) is associated with two or more RLC entities (e.g., the first RLC entity 542 and the second RLC entity 543). The UE 510 may identify that the two or more associated RLC entities (e.g., the first RLC entity 542 and the second RLC entity 543) belong to different cell groups. In this instance, the UE 510 may identify whether the sum of the amount of data to be transmitted to a BS in a PDCP layer and the total amount of data to be transmitted to the BS in an RLC layer is greater than or equal to an uplink split threshold value. If the obtained sum of the amount of PDCP data and the total amount of RLC data is greater than or equal to the uplink split threshold value, the transmission PDCP entity (e.g., the second PDCP entity 541) of the UE 510 may provide (submit) a PDCP PDU to a primary RLC entity or a secondary RLC entity. If the sum of the amount of PDCP data and the total amount of RLC data is less than the uplink split threshold value, the transmission PDCP entity (e.g., the second PDCP entity 541) of the UE 510 may provide the PDCP PDU to only the primary RLC entity. As described above, the UE 510 may transmit data via the primary path 531 and the secondary path 532, if the size of data to be transmitted is greater than or equal to a threshold value. If the size of data to be transmitted is less than the threshold value, the UE 510 may transmit data only via the primary path 531. In this instance, data reception, as well as data transmission, may not be performed via the secondary path 532 of the UE 510. Based on the fact that data is not transmitted or received via the secondary path 532 during a designated period of time, an entity associated with the secondary path 532 (or hardware associated with the secondary path 532) may perform PDCCH monitoring during a designated period of time by a designated cycle, and various embodiments related thereto will be described later.

The description may also be equally applied to the case in which the first BS 520a operates as an MN, the second BS 520b operates as an SN, a path that passes the first BS is set as a primary path, and a path that passes the second BS is set as a secondary path.

Figure 5B:
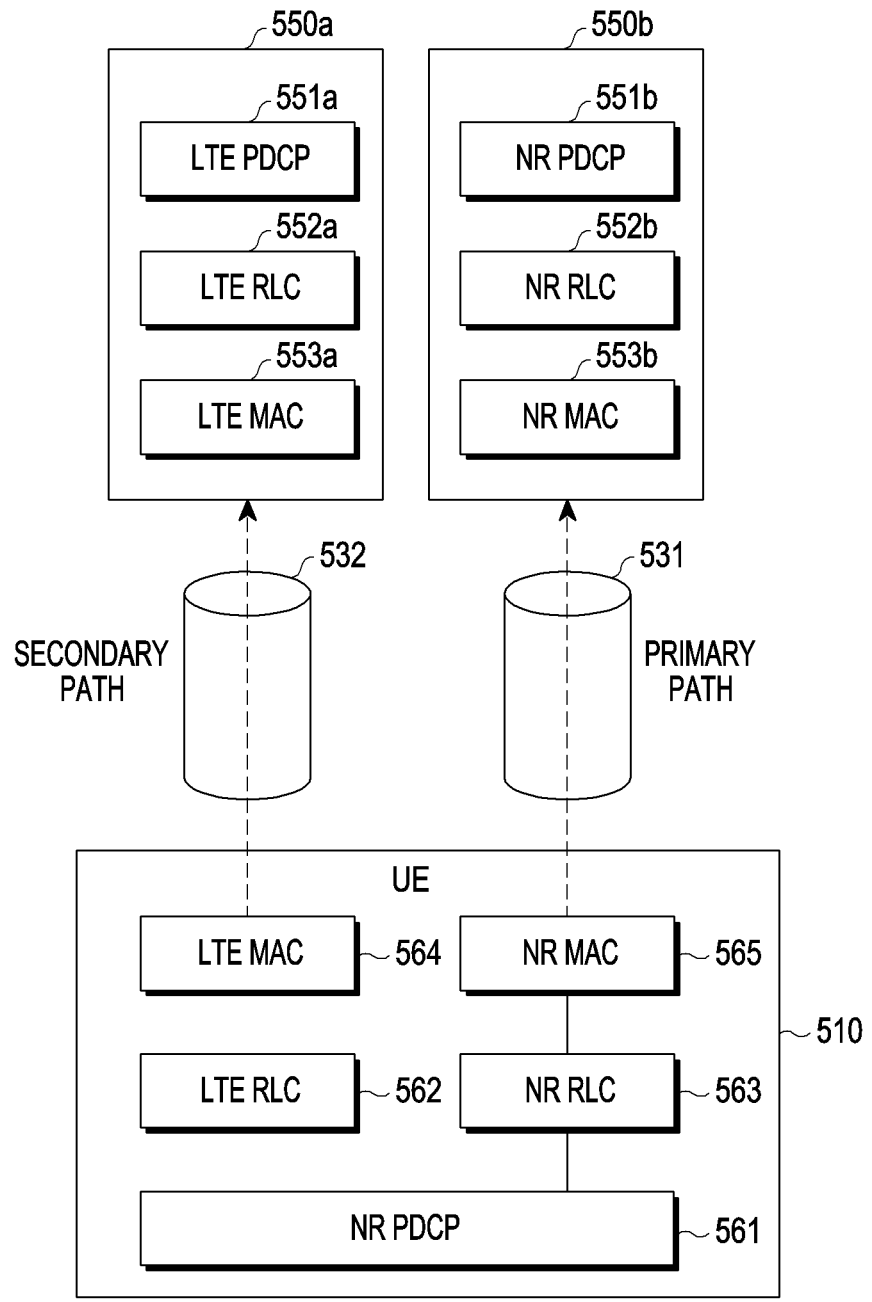
FIG. 5B is a diagram illustrating a path between a UE and a BS when a split bearer is configured in evolved universal terrestrial radio access (E-UTRA) new radio dual connectivity (EN-DC) according to an embodiment of the disclosure.

FIG. 5B is a diagram illustrating a path between a UE and a BS when a split bearer is configured in EN-DC according to an embodiment of the disclosure.

Referring to FIG. 5B, the UE 510 according to various embodiments may configure a split bearer in EN-DC. Accordingly, an NR PDCP entity 561 may be associated with an LTE RLC entity 562 and an NR RLC entity 563. The LTE RLC entity 562 may be associated with an LTE MAC entity 564, and the NR RLC entity 563 may be associated with an NR MAC entity 565. An NR MAC entity 553b of a BS 550b may correspond to the NR MAC entity 565. An LTE MAC entity 553a of a BS 550a may correspond to the LTE MAC entity 564. The LTE PDCP entity 551a of the BS 550a may be associated with an LTE RLC entity 552a, and the NR PDCP entity 551b of the BS 550b may be associated with an NR RLC entity 552b. The LTE RLC entity 552a may be associated with an LTE MAC entity 553a, and the NR RLC entity 552b may be associated with an NR MAC entity 553b. An NR network may be set as the primary path 531, and an LTE network may be set as the secondary path 532. In EN-DC, in the case of the BS 550a of LTE, the standard suggests that the NR PDCP entity be configured. Particularly, for a split bearer, in the case of the BS 550a of LTE, the NR PDCP entity needs to be configured. According to various embodiments, an NR PDCP entity for a split bearer operation may be included in the BS 550a of LTE. According to various embodiments, an NR PDCP entity for a split bearer operation may be included in the NR BS 550b. According to various embodiments, an NR PDCP entity for a split bearer operation may be included in the BS 550a of LTE and the NR BS 550b. According to various embodiments, implementation may be performed so that one of the LTE PDCP entity 551a and the NR PDCP entity 551b operates. In the case of a split bearer, at least one of the LTE PDCP entity 551a of the LTE BS 550a or the NR PDCP entity 551b of the NR BS 550b may transmit data to a core network. In terms of efficiency, the case in which the NR PDCP entity 551b is configured in the primary path 531 may be favorable. However, configuration of the primary path 531 is not limited thererto. However, the NR PDCP entity 551b may also be configured for the LTE BS 550a. In addition, the LTE BS 550a and the NR BS 550b may directly perform data transmission or reception with each other. As described above, various embodiments based on various types of DC, in addition to EN-DC of FIG. 5B, may be applicable.

Figure 6A:
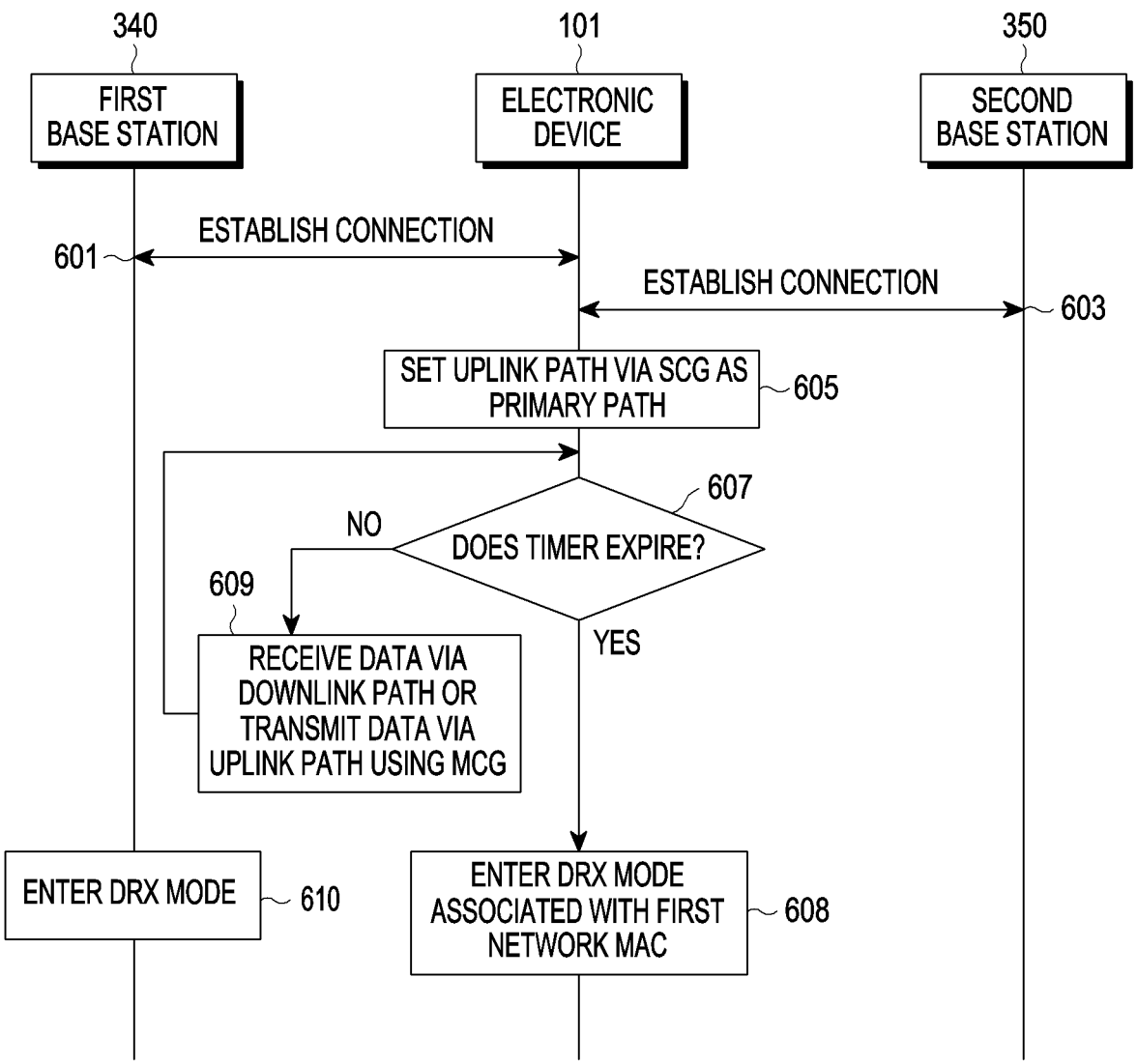
FIG. 6A is a flowchart illustrating an operation method of an electronic device, a long term evolution (LTE) base station, and a new radio (NR) base station according to an embodiment of the disclosure.

FIG. 6A is a flowchart illustrating an operation method of an electronic device, an LTE base station, and an NR base station according to an embodiment of the disclosure.

Referring to FIG. 6A, according to various embodiments, the electronic device 101 (e.g., at least one of the processor 120, the first communication processor 212, the second communication processor 214, or the integrated communication processor 260) may establish a connection to the first base station 340 (e.g., an LTE BS) in operation 601. The process in which the electronic device 101 establishes a connection to the first base station 340 may include, for example, at least one from among an operation of establishing a random-access channel (RACH) and RRC connection, an operation in which a mobility management entity (MME) associated with the first BS 340 obtains an IMSI of the electronic device 101 (e.g., a UE), an operation in which the electronic device 101 authenticates an LTE network, an operation in which the MME authenticates the electronic device 101, non-access stratum (NAS) security setup, location update, or attach completion by evolved packet system (EPS) session establishment. Those skilled in the art may easily understand that a connection may be established by the operation of an entity (e.g., an MME, serving gateway (S-GW), packet data network (PDN) gateway (P-GW), home subscriber server (HSS), policy and charging rules function (PCRF), and subscriber profile repository (SPR)) other than the first base station 340 (e.g., an eNodeB). For example, the electronic device 101 may perform data transmission or reception with an entity other than the first BS 340, as well as the first BS 340, and may establish a connection. The establishment of the connection may mean attach completion (attach complete).

In operation 603, the electronic device 101 according to various embodiments may establish a connection to the second BS 350 (e.g., an NR BS). For example, the first base station 340 may transmit an RRC connection reconfiguration message including configuration information associated with SCG cell measurement (e.g., a measurement object (MO) associated with an SCG), and the electronic device 101 may transfer a result of SCG cell measurement to the first base station 340. The first base station 340 may select an SCG, may transmit an add request (e.g., SgNB Add Request) to the selected second base station 350, and may receive an acknowledgment (Ack) in response thereto from the second base station 350. The first base station 340 may transmit, to the electronic device 101, an RRC connection reconfiguration message associated with an SCG add configuration to the electronic device 101. The electronic device 101 may perform synchronization signal block (SSB), and may perform a RACH procedure with the second base station 350. Accordingly, SCG addition may be completed (SCG add complete). In this instance, the electronic device 101 may be changed from an RRC IDLE state to an RRC CONNECTED state. An RRC IDLE state is the state in which a wireless connection (RRC connection) is not established between a base station and a UE. An RRC CONNECTED state is the state in which a wireless connection (RRC connection) between a base station and a UE is established.

DRX may be used in an RRC IDLE state, an RRC INACTIVE state, and an RRC CONNECTED state. A DRX mode in an idle state may be referred to as an IDRX, and a DRX mode in a connected state may be referred to as a CDRX. According to an embodiment, the IDRX may operate in association with a monitoring cycle related to a paging signal. According to an embodiment, the CDRX may operate in association with a monitoring cycle related to a PDCCH. According to an embodiment, a DRX mode in an RRC INACTIVE state may operate in association with an RAN based-paging period. According to various embodiments, the electronic device 101 may set an uplink path via an SCG (or SN) as a primary path in operation 605. For example, the electronic device 101 may set an uplink path via an SCG as a primary path, based on information in an RRC connection reconfiguration message. If the size of data to be transmitted (e.g., the sum of the amount of PDCP data and the amount of RLC data) is less than an uplink split threshold value, the electronic device 101 may transmit transmission data via the primary path. Setting an SCG as a UL primary path is merely an example, and the electronic device 101 may set an MCG as a primary path.

According to various embodiments, the electronic device 101 may operate a DRX timer for each of the first base station 340 and the second base station 350 in operation 607. The electronic device 101 may successfully decode a physical downlink control channel (PDCCH) that indicates at least one of uplink user data or downlink user data for the electronic device 101, and may start a timer (e.g., a DRX inactivity timer). For example, the electronic device 101 may start a DRX timer for each of a UL primary path and a secondary path of the electronic device 101. A parameter related to discontinuous reception (DRX) may be applied to "MAC-Main config" of an RRC connection reconfiguration message. However, the scheme in which the electronic device 101 obtains a parameter related to DRX is not limited. The time expiry of the DRX timer may be expressed as, for example, the number of consecutive transmission time intervals (TTI). The time expiry of the DRX timer according to various embodiments may be expressed as an absolute time (e.g., millisecond unit). The electronic device 101 may monitor a PDCCH until the DRX timer expires. If the result of PDCCH monitoring shows that transmission data or reception data is present, the DRX timer may restart. According to various embodiments, if a DRX timer by a first MAC (e.g., an LTE MAC) expires, the electronic device 101 may enter a DRX mode by a first network MAC (e.g., an LTE MAC) in operation 608. The fact that the electronic device 101 enters the DRX mode may mean that a node of which the DRX timer expires in the electronic device 101 suspends constant PDCCH monitoring and performs PDCCH monitoring by a designated cycle (e.g., a short DRX cycle or a long DRX cycle). The DRX mode may be the state in which PDCCH monitoring is performed in some subframes, as opposed to all subframes, and may be distinguished from an activated state that performs PDCCH monitoring in all subframes. This will be described with reference to FIG. 6B. In the DRX mode, the electronic device 101 may receive data via a downlink path or may transmit data via an uplink path, via an SCG. According to various embodiments, if a DRX timer by a second MAC (e.g., an NR MAC) expires, the electronic device 101 enters a DRX mode by the second MAC (e.g., an NR MAC), and may receive data via a downlink path and may transmit data via an uplink path, using an MCG, in operation 608.

According to various embodiments, if the DRX timer does not expire in operation 607 (No), the electronic device 101 may receive data via a downlink path or transmit data via an uplink path, using the MCG in operation 609. The electronic device 101 repeats the determination of whether the DRX timer expires and when it is determined that the DRX timer does expire in operation 607 (Yes), then operation 608 is performed.

In operation 610, the first base station 340 may also enter a DRX mode. For example, the first base station 340 may identify itself that a DRX timer expires, and may enter a DRX mode. In the case of entry to the DRX mode by the first MAC (e.g., LTE MAC), the first base station 340 corresponding to the first MAC may hold data transmission during a period of time (e.g., a battery saving interval) in which the electronic device 101 does not monitor a PDCCH. Although FIG. 6A describes entry to a DRX mode in association with an MCG, this is merely an example. It is also possible that the electronic device 101 and the second base station 350 enter a DRX mode when a designated DRX timer expires.

According to various embodiments, even while the electronic device 101 performs data transmission or reception via a path using an SCG, if data is not transmitted or received via a path using an MCG, a CP corresponding to the MCG may enter a DRX mode. The electronic device 101 may perform control so that a CP corresponding to the SCG remains in an activated state, and the CP corresponding to the MCG enters a DRX mode. Alternatively, the electronic device 101 may perform control so that only a block that corresponds to the MCG in an integrated CP operates in a DRX mode, and a block corresponding to the SCG operates in an activated state. A block may be, for example, a piece of independent hardware or a logical block that is capable of performing a CP operation in a system on chip (SoC).

Although FIG. 6A illustrates that a path corresponding to NR is set as a primary path and an entity (e.g., a CP) corresponding to LTE enters a DRX mode, this is merely an example. The electronic device 101 may set a path corresponding to LTE as a primary path, and may configure an entity (e.g., a CP) corresponding to NR to enter a DRX mode when a timer expires. In addition, as described above, an entity corresponding to a primary path may also enter a DRX mode. According to various embodiments, operations performed based on an NR-related entity of the electronic device 101 and operations performed based on an LTE-related entity may be interchangeable with each other.

Figure 6B:
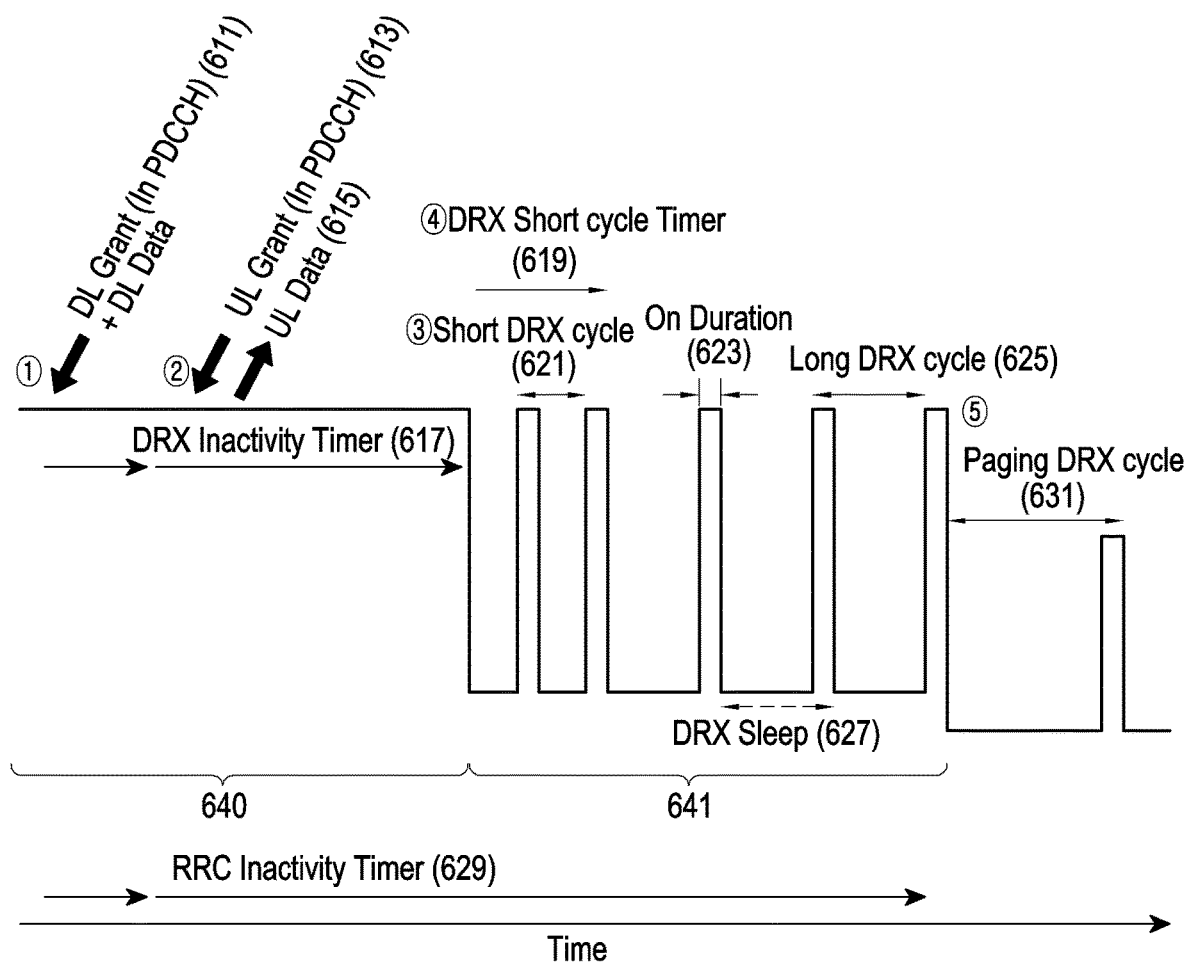
FIG. 6B is a timing diagram illustrating an operation performed in a discontinuous reception (DRX) mode according to an embodiment of the disclosure.

FIG. 6B is a timing diagram illustrating an operation performed in a DRX mode according to an embodiment of the disclosure.

Referring to FIG. 6B, according to various embodiments of the disclosure, at least some of the first communication processor 212, the second communication processor 214, or the integrated communication processor 260 of FIG. 2A or FIG. 2B may enter a DRX mode 641, when a timer expires. The electronic device 101 may receive DL grant and DL data via a PDCCH, in operation 611. The electronic device 101 may restart a timer. Before the timer expires, the electronic device 101, for example, may identify UL grant in a PDCCH in operation 613, and may transmit UL data in operation 615. The electronic device 101 may restart a timer 617 (e.g., a DRX inactivity timer). Until the timer expires, the electronic device 101 may constantly monitor a PDCCH, for example, in all subframes. An activated state 640 is a state before the timer expires, that is, the state in which the timer is operating. Alternatively, the activated state 640 is a state beyond a DRX mode. An activated state may be the state of performing PDCCH monitoring in all subframes in the case of LTE, or in a designated subframe in a network in the case of NR.

According to various embodiments, if the timer expires, the electronic device 101 enters the DRX mode 641. In the DRX mode, the electronic device 101 may perform PDCCH monitoring by a short DRX cycle 621. For example, the electronic device 101 may not perform PDCCH monitoring in some subframes. Monitoring may be performed during an on-duration 623. In a period (e.g., a battery saving interval) other than the on-duration 623, the entity (e.g., a CP) of the electronic device 101 that enters the DRX mode may be in a sleep state 627, and thus, the amount of power consumed may be saved. The DRX mode 641 may be a state of monitoring a PDCCH during a predetermined period of time (e.g., on-duration) by a predetermined cycle (e.g., a DRX cycle). The DRX mode 641 may be the state of monitoring a PDCCH in a smaller number of subframes than the activated state 640, when the timer expires.

According to various embodiments, the electronic device 101 may enter the DRX mode 641, and may start a DRX short cycle timer 619. When the DRX short cycle timer 619 expires, the electronic device 101 may monitor a PDCCH by a long DRX cycle 625. If an RRC inactivity timer 629 expires, the electronic device 101 enters an RRC idle state, and may monitor a PDCCH by a paging DRX cycle 631. According to various embodiments, if the electronic device 101 enters a DRX mode, the electronic device 101 may monitor a PDCCH by a single cycle (e.g., a long DRX cycle).

A base station (e.g., an LTE BS) according to various embodiments may transmit data to the electronic device 101 during the on-duration 623 of the electronic device 101. The electronic device 101 and the base station may synchronize DRX cycles. Accordingly, the base station may also identify whether the electronic device 101 is in the on-duration 623 or in the sleep state 627. Based on the same, the base station may perform scheduling associated with the electronic device 101. Even though the base station obtains data and completes modulation during a period corresponding to the sleep state 627 ahead of the on-duration 623, the base station may hold data transmission (e.g., at least one of DL Grant or DL data) until the on-duration 623 arrives.

Although FIG. 6B describes a DRX mode in an RRC Connected state, this is merely an example. Those skilled in the art may understand that the electronic device 101 according to various embodiments may enter a DRX mode even in a state other than the RRC connected state, that is, an RRC Idle state or an RRC inactive state.

Figure 7:
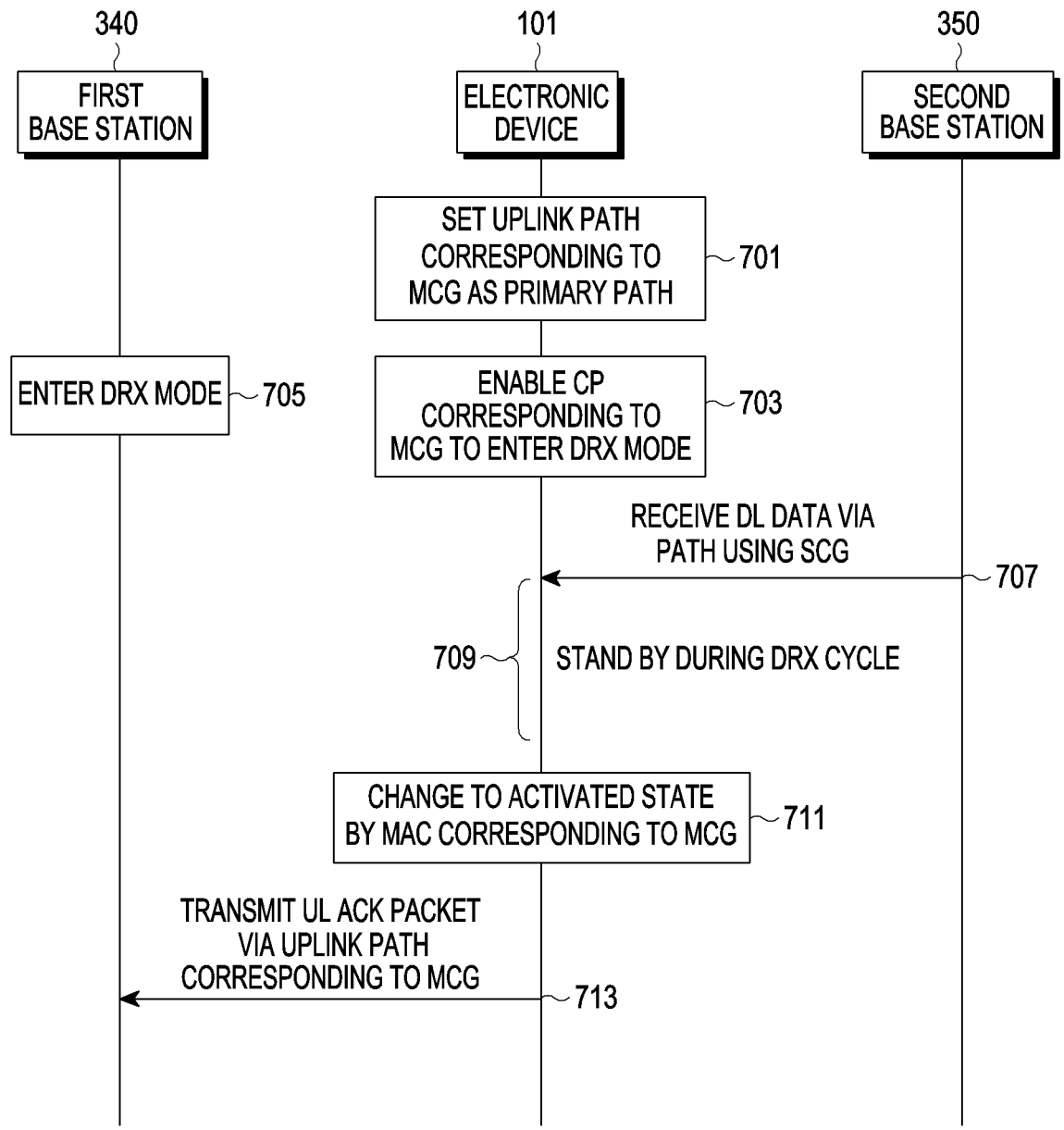
FIG. 7 is a flowchart illustrating an operation of an electronic device, an LTE base station, and an NR base station according to an embodiment of the disclosure.

FIG. 7 is a flowchart illustrating an operation method of an electronic device, an LTE base station, and an NR base station according to an embodiment of the disclosure. In addition, the first base station (BS) 340 (e.g., an LTE BS) and the second base station (BS) 350 (e.g., an NR BS) are merely examples of a BS in an EN-DC environment. Those skilled in the art may understand that a BS may be changed to another type depending on the type of dual connectivity.

According to the comparative example, the electronic device 101 (e.g., at least one of the processor 120, the first communication processor 212, the second communication processor 214, or the integrated communication processor 260) may set an uplink (UL) path corresponding to an MCG as a primary path in operation 701. The electronic device 101 may set a downlink (DL) path as an SCG path. The electronic device 101 may set a UL primary path and a DL path to be different from each other. In operation 703, the electronic device 101 may enter a CP corresponding to the MCG to a DRX mode. In operation 705, the first BS 340 corresponding to the MCG may enter a DRX mode. In operation 707, the electronic device 101 may receive DL data via a path that is based on the SCG. In this instance, the electronic device 101 may need to transmit UL data (e.g., UL acknowledgement (ACK) packet) corresponding to the DL data. Furthermore, the size of UL data may be less than a data split threshold value, and the electronic device 101 may need to transmit the UL data via a UL primary path. The electronic device 101 may stand by during a DRX cycle 709, and may change to an activated state by a MAC corresponding to the MCG in operation 711. In this instance, the SCG may maintain a DRX mode. In operation 713, the electronic device 101 may transmit a UL ACK packet via the uplink path corresponding to the MCG. Accordingly, there may be an unnecessary time limit during the period of time corresponding to the DRX cycle 709. In addition, power consumed for waking up a CP corresponding to the MCG may be wasted.

The embodiment of FIG. 7 may be performed when any one of the entities (e.g., an entity corresponding to the MCG) of the electronic device 101 enters a CDRX mode, for example, in an RRC connected state. However, the disclosure is not limited thereto. Also, those skilled in the art may understand that the embodiment of FIG. 7 may be applied to the case in which any one entity enters a DRX mode in an RRC IDLE state or an RRC INACTIVE state. The fact that the above-mentioned state is not limited may be applied to all embodiments of the disclosure.

Figure 8:
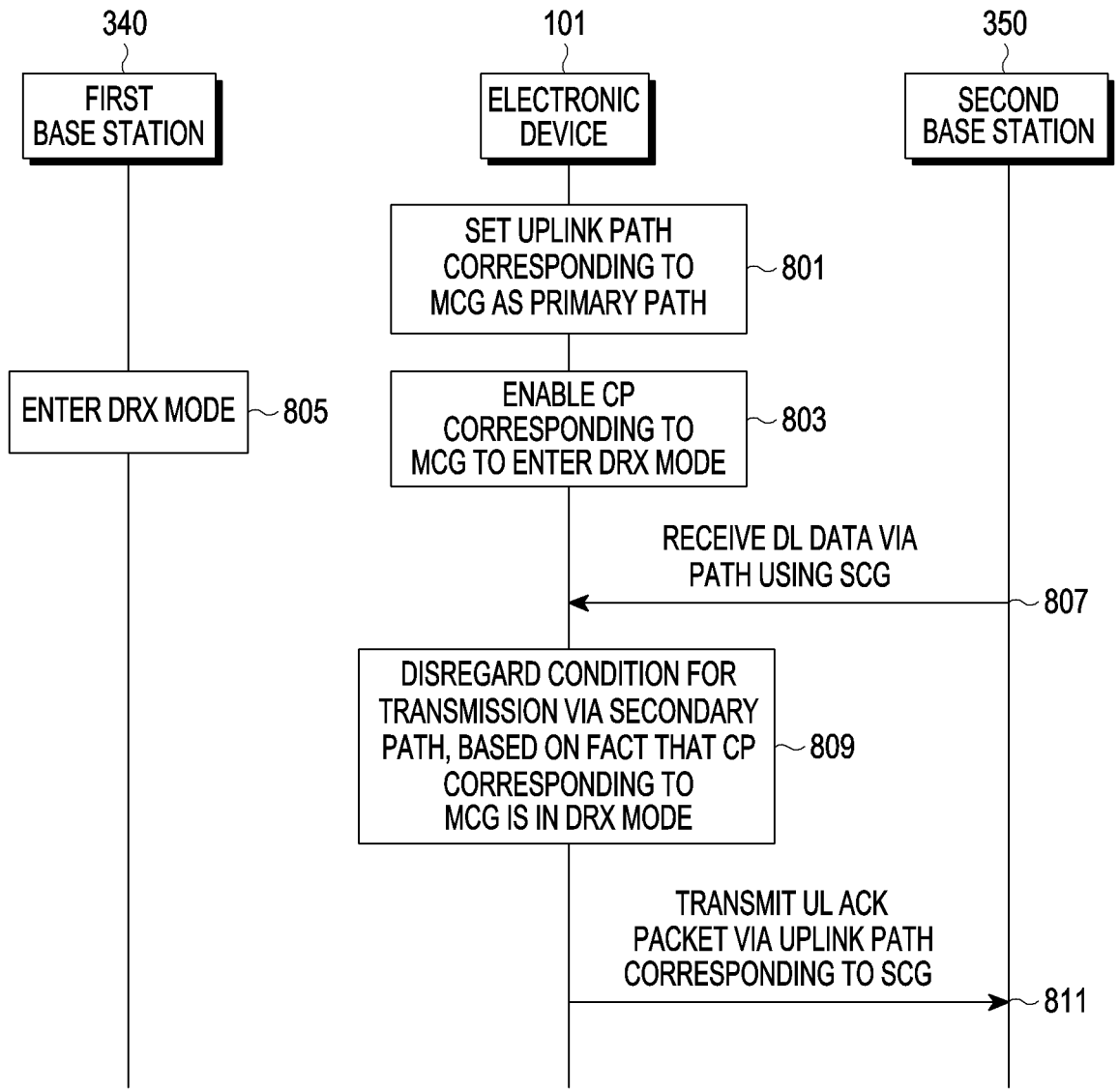
FIG. 8 is a flowchart illustrating an operation of an electronic device, an LTE base station, and an NR base station according to an embodiment of the disclosure.

FIG. 8 is a flowchart illustrating an operation of an electronic device, an LTE base station, and an NR base station according to an embodiment of the disclosure.

Referring to FIG. 8, according to various embodiments of the disclosure, the electronic device 101 (e.g., at least one of the processor 120, the first communication processor 212, the second communication processor 214, or the integrated communication processor 260) may set an uplink path corresponding to an MCG as a primary path in operation 801. The electronic device 101 may select a primary path, based on information included in an RRC connection reconfiguration message received from the MN 310. Furthermore, the electronic device 101 may identify a condition for transmission via a secondary path (e.g., an uplink data split threshold), based on the information included in the RRC connection reconfiguration message. The uplink data split threshold may be set to, for example, 0, infinite, or a value between 0 and infinite, and the uplink data split threshold value is not limited.

In operation 803, the electronic device 101 may enter a CP (e.g., the second communication processor 214) corresponding to the MCG to a DRX mode. For example, the second communication processor 214 may enter a DRX mode, based on identifying that a DRX timer has expired. In operation 805, the first BS 340 corresponding to the MCG may also enter a DRX mode. In the disclosure, the fact that a base station (BS) enters a DRX mode may mean that information indicating data transmission or reception via a PDCCH is transmitted during an on-duration (e.g., the on-duration 623) if a DRX inactivity timer for a predetermined UE is identified as having expired. Although the embodiment of FIG. 8 describes that a BS corresponding to an MCG is the first BS 340 (e.g., an LTE BS), and a BS corresponding to an SCG is the second BS 350 (e.g., an NR BS), this is merely an example. Depending on implementation, the BS corresponding to the SCG may be set as the first BS 340 (e.g., an LTE BS), and the BS corresponding to the MCG may be set as the second BS 350 (e.g., an NR BS).

According to various embodiments, in operation 807, the electronic device 101 may receive DL data via a path that is based on the SCG. Before DL data reception, a communication processor corresponding to the SCG, which had been in a DRX mode, could enter an activated state, or a communication processor corresponding to the SCG could be in an activated state. The electronic device 101 may set, for example, a path via the SCG as a path for receiving DL data. The electronic device 101 may be configured to transmit a UL ACK packet based on the reception of the DL data. In operation 809, the electronic device 101 may disregard the condition for transmission via the secondary path, based on the fact that the communication processor corresponding to the MCG is in a DRX mode. In operation 811, the electronic device 101 may transmit a UL ACK packet via an uplink path corresponding to the SCG. For example, the communication processor corresponding to the SCG may receive information indicating whether the state is the DRX mode, from the communication processor corresponding to the MCG. The communication processor corresponding to the SCG may disregard the condition for transmission via the secondary path (e.g., whether the size of data to be transmitted is greater than or equal to the UL data split threshold value), based on the fact that the communication processor corresponding to the MCG is in the DRX mode. Irrespective of the condition for transmission via the secondary path, the communication processor corresponding to the SCG may determine to transmit UL data via the communication processor corresponding to the SCG. If an entity in the primary path is in a DRX mode, the electronic device 101 may transmit UL ACK data via the secondary path even though UL ACK data is less than the UL data split threshold value. For example, the NR PDCP (e.g., NR PDCP 561) of the electronic device 101 may select a UL path for an ACK packet associated with a layer lower than a PDCP layer. A packet of an RLC ACK may be transmitted in an RLC layer.

The electronic device 101 may transmit UL ACK data without waking up the communication processor corresponding to the MCG. The communication processor corresponding to the MCG may maintain the DRX mode, and accordingly, a relatively low amount of power may be consumed. In addition, UL ACK data may be transmitted without waiting until the on-duration arrives, and a communication delay time may be reduced.

Although FIG. 8 illustrates that a path corresponding to the MCG is set as a UL primary path, and a path corresponding to the SCG is set as a DL path, this merely an example. According to various embodiments, the path corresponding to the MCG may be set as a DL path, and the path corresponding to the SCG may be set as a UL primary path. If an entity corresponding to the SCG is in a DRX mode, the electronic device 101 may receive DL data via the path corresponding to the MCG. The electronic device 101 may disregard the condition for transmission via the secondary path, and may transmit UL ACK data via the path corresponding to the MCG. Those skilled in the art may easily understand that embodiments of the disclosure are applicable to the case in which a UL primary path and a DL path are set to be different from each other.

Figure 9:
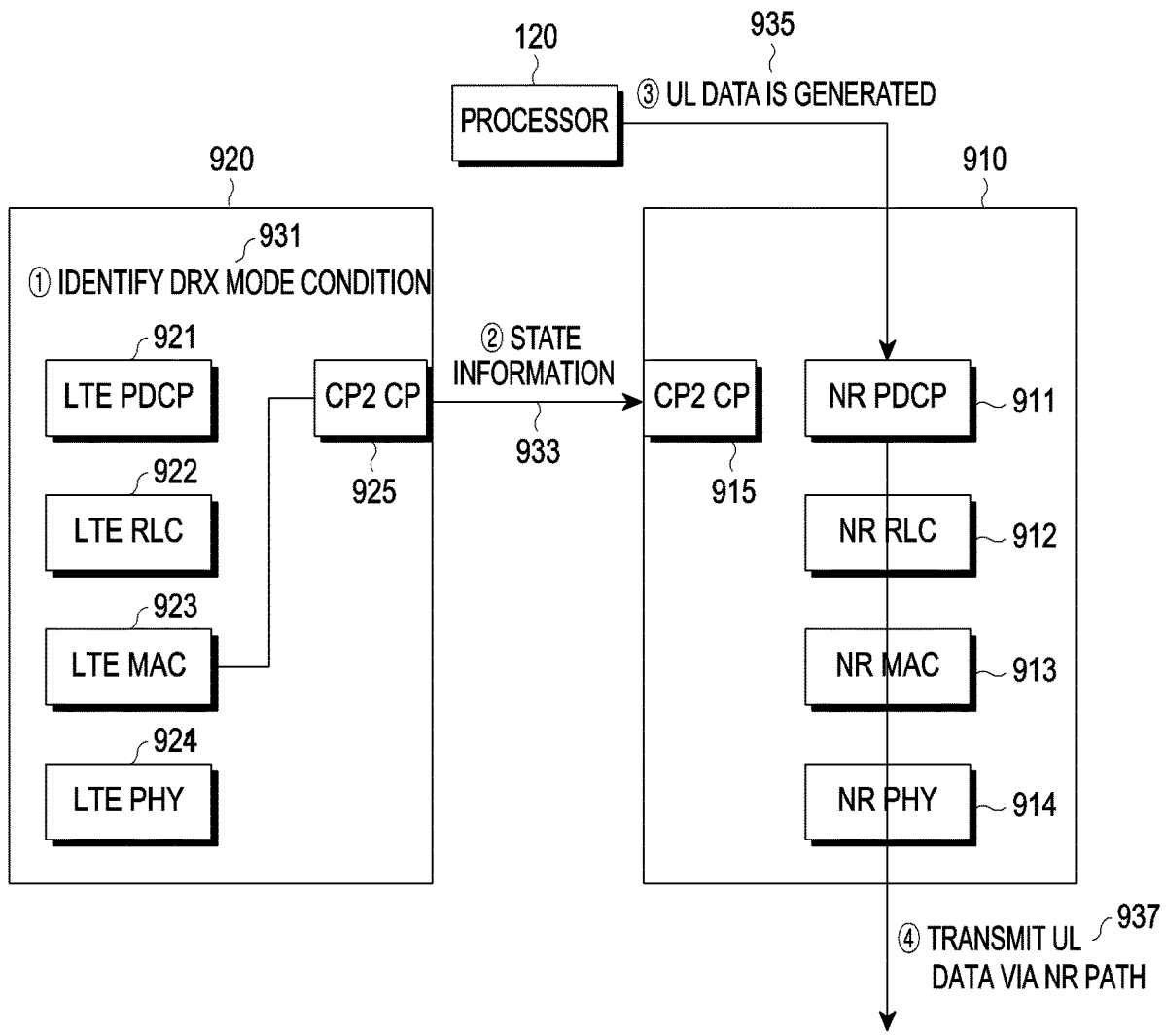
FIG. 9 is a diagram illustrating a structure of two communication processors according to an embodiment of the disclosure.

FIG. 9 is a diagram illustrating a structure of two communication processors according to an embodiment of the disclosure.

Referring to FIG. 9, the electronic device 101 according to various embodiments may include an NR communication processor 910 and an LTE communication processor 920. For example, the electronic device 101 may set NR network communication as a DL path, and may set LTE network communication as a UL primary path. The electronic device 101 may identify an uplink data split threshold value in order to use a secondary path (e.g., NR network communication). The LTE communication processor 920 may identify that a DRX mode condition is satisfied in operation 931. For example, the LTE communication processor 920 may identify that a DRX mode condition is satisfied, based on the fact that a DRX inactivity timer expires. In operation 933, the LTE communication processor 920 may transfer state information (e.g., a DRX mode flag) indicating whether the state is a DRX mode, to the NR communication processor 910. For example, an LTE MAC entity 923 of the LTE communication processor 920 may transmit state information indicating whether the state is a DRX mode, to an NR PDCP entity 911 via a CP2CP transmission/reception module 925 and a CP2CP transmission/reception module 915. The CP2CP transmission/reception module 925 and the CP2CP transmission/reception module 915 may be implemented as, for example, HS-UARTs, but the type of interface between the CPs is not limited, as described above. For example, the state information may be expressed as a DRX mode flag, or may have a value of 1, and whether the state is a DRX mode or an activated state may be identified based on the value of the state information. For example, the state information may be expressed by indicating whether a CP is in a sleep state, and the size of bits is not limited. The LTE communication processor 920 may output information indicating whether a state is a DRX mode, periodically, or in response to detection of a change in the state.

According to various embodiments, the processor 120 may generate UL data (e.g., a packet) in operation 935. For example, the processor 120 may generate ACK data corresponding to DL data as UL data. Alternatively, the processor 120 may generate UL data, irrespective of reception of DL data. The processor 120 may transfer UL data to the NR PDCP entity 911. The NR PDCP entity 911 may identify information indicating whether the LTE communication processor 920 is in a DRX mode. If it is identified that the LTE communication processor 920 is in a DRX mode, based on state information, the NR PDCP entity 911 may transfer a PDU to an NR RLC entity 912, irrespective of whether the size of the UL data is greater than or equal to the uplink data split threshold value. Accordingly, the UL data may be transmitted via an NR MAC entity 913 and an NR physical (PHY) entity 914, in operation 937. If it is identified that the LTE communication processor 920 is not in a DRX mode, the NR PDCP entity 911 may transfer the PDU to an LTE RLC entity 922 when the size of the UL data is less than the uplink data split threshold value. Accordingly, the UL data may be transmitted to the outside via an LTE MAC entity 923 and an LTE PHY entity 924.

The NR communication processor 910 according to various embodiments may be referred to as, for example, an NR modem or a 5G modem. Those skilled in the art may easily understand that the LTE PDCP entity 921 and/or NR PDCP entity 911 may be configured as a PDCP entity that is capable of supporting both NR and LTE.

According to various embodiments, the NR PDCP entity 911, the NR RLC entity 912, the NR MAC entity 913, and the NR PHY entity 914 configured for (or implemented in) the NR communication processor 910 may process and output UL data. A signal that is based on the UL data processed by the NR PDCP entity 911, the NR RLC entity 912, the NR MAC entity 913, and the NR PHY entity 914 may be output to the outside via an RFIC, RFEE, and antenna. Based on input data (e.g., a PDCP SDU (or an IP packet)), the NR PDCP entity 911 or the LTE PDCP entity 921 may perform at least one function from among header compression and decompression (robust header compression (ROHC) only), user data transmission (transfer of user data), sequential delivery (in-sequence delivery of upper layer PDUs at PDCP re-establishment procedure for RLC acknowledged mode (AM)), reordering (for split bearers in DC (only support for RLC AM) PDCP PDU routing for transmission and PDCP PDU reordering for reception), duplicate detection (duplicate detection of lower layer SDUs at PDCP re-establishment procedure for RLC AM), retransmission (retransmission of PDCP SDUs at handover and, for split bearers in DC, of PDCP PDUs at PDCP data-recovery procedure, for RLC AM), ciphering and deciphering, or timer-based SDU discard (timer-based SDU discard in uplink). Based on input data (e.g., an RLC SDU), the NR RLC entity 912 or the LTE RLC entity 922 may perform at least one function from among data transmission (transfer of upper layer PDUs), automatic repeat request (ARQ) (error correction through ARQ (only for AM data transfer)), concatenation, segmentation, and reassembly (concatenation, segmentation and reassembly of RLC SDUs (only for unacknowledged mode (UM) and AM data transfer)), re-segmentation (re-segmentation of RLC data PDUs (only for AM data transfer)), reordering (reordering of RLC data PDUs (only for UM and AM data transfer)), duplicate detection (duplicate detection (only for UM and AM data transfer)), error detection (protocol error detection (only for AM data transfer)), RLC SDU discard (RLC SDU discard (only for UM and AM data transfer)), or RLC re-establishment. The NR MAC entity 913 or the LTE MAC entity 923 may enter a DRX mode, and may change the state from the DRX mode to an activated mode. The NR MAC entity 913 or the LTE MAC entity 923 may manage the power source of a corresponding communication processor, based on a DRX mode or an activated state. For example, the NR MAC entity 913 or the LTE MAC entity 923 may perform control so as to perform PDCCH monitoring in all subframes (or a subframe designated by a network) in an activated state, or may perform control so as to perform PDCCH monitoring in a smaller number of subframes than the activated state in a DRX mode. According to various embodiments, the NR MAC entity 913 or the LTE MAC entity 923 may share state information indicating whether the current state is a DRX mode. Based on input data (e.g., an MAC SDU), the NR MAC entity 913 or the LTE MAC entity 923 may perform at least one function from among mapping (mapping between logical channels and transport channels), multiplexing and demultiplexing (multiplexing/demultiplexing of MAC SDUs belonging to one or different logical channels into/from transport blocks (TB) delivered to/from the physical layer on transport channels), scheduling information reporting, hybrid ARQ (HARQ) (error correcting via HARQ), priority handling between logical channels (priority handling between logical channels of one UE), priority handling between UEs (priority handling between UEs by means of dynamic scheduling), multimedia broadcast multicast service (MBMS) identification, transport format selection, or padding. The NR PHY entity 914 or the LTE PHY entity 924 may perform channel-coding and modulating of higher layer data to generate an orthogonal frequency division multiplex (OFDM) symbol and may transmit the OFDM symbol via a wireless channel, or may perform demodulating and channel-decoding of the OFDM symbol, received via a wireless channel, and may transmit the demodulated and channel-decoded OFDM symbol to a higher layer. According to various embodiments, the disclosure expresses that the operation of the NR PDCP entity 911, the NR RLC entity 912, the NR MAC entity 913, and the NR PHY entity 914 is performed by the NR communication processor 910, and the operation of the LTE PDCP entity 921, the LTE RLC entity 922, the LTE MAC entity 923, and the LTE PHY entity 924 is performed by the LTE communication processor 920.

Figure 10:
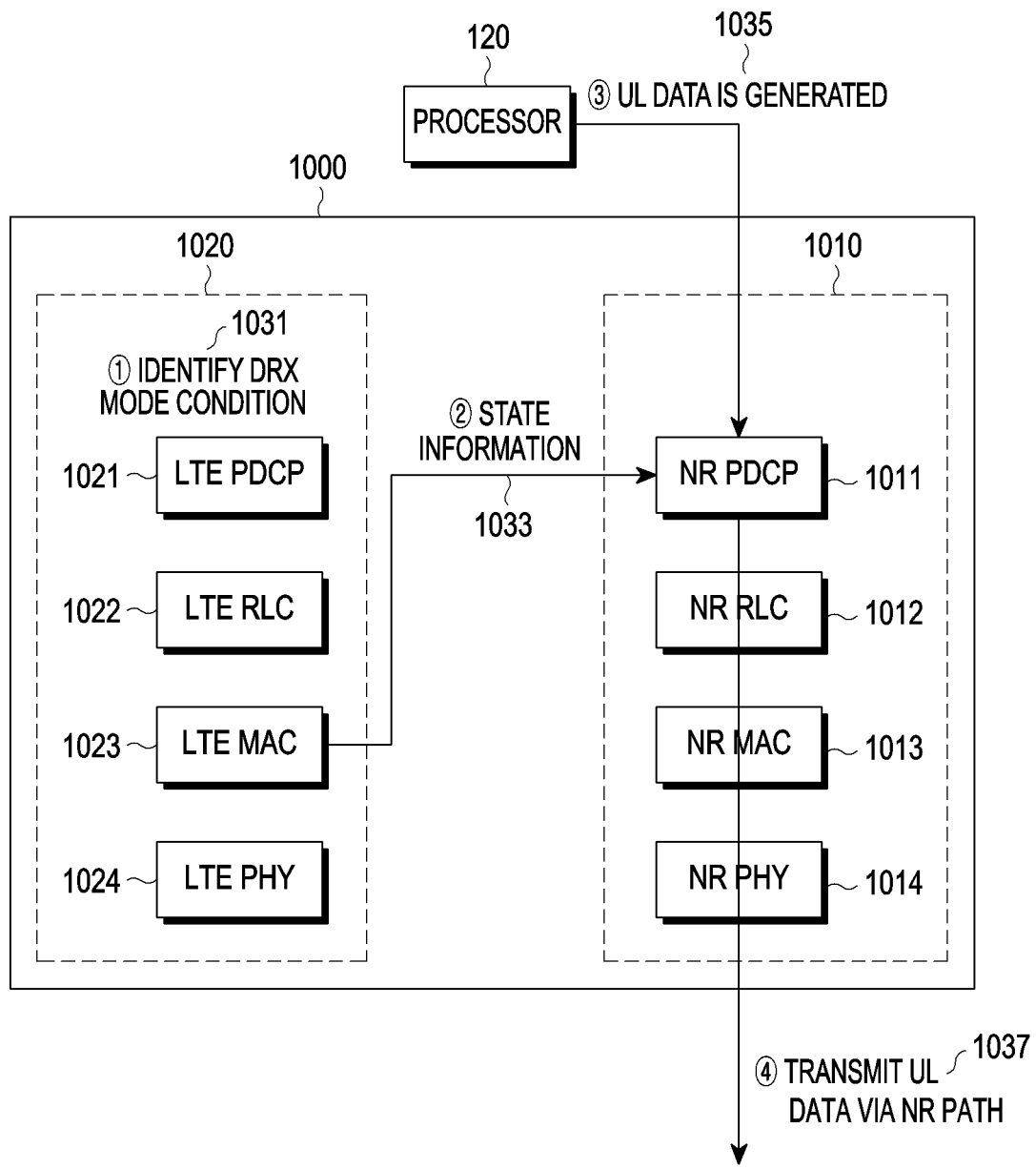
FIG. 10 is a diagram illustrating a structure of an integrated communication processor according to an embodiment of the disclosure.

FIG. 10 is a diagram illustrating a structure of an integrated communication processor according to an embodiment of the disclosure.

Referring to FIG. 10, an integrated communication processor 1000 (e.g., the integrated communication processor 260) according to various embodiments may include an NR block 1010 and an LTE block 1020. The NR block 1010 and the LTE block 1020 may be divided in terms of hardware within the integrated communication processor 1000 or may be divided logically (e.g., within a protocol stack). An NR PDCP entity 1011, an NR RLC entity 1012, an NR MAC entity 1013, and an NR PHY entity 1014 may be configured for (or implemented in) the NR block 1010. An LTE PDCP entity 1021, an LTE RLC entity 1022, an LTE MAC entity 1023, and an LTE PHY entity 1024 may be included in (or configured for) the LTE block 1020.

According to various embodiments, the electronic device 101 may set LTE network communication as a primary path. Accordingly, if the LTE block 1020 is in an activated state, as opposed to a DRX mode, and if the amount of data to be transmitted is less than a threshold value, UL data may be transferred to the LTE block 1020. In the activated state, the LTE block 1020 may transmit the UL data. When a timer expires, the LTE block 1020 may enter a DRX mode. In operation 1031, the LTE block 1020 may identify a DRX mode condition (e.g., DRX inactivity timer expiry). In operation 1033, the LTE MAC entity 1023 may transfer state information (e.g., a DRX mode flag) to the NR PDCP entity 1011. In operation 1035, the processor 120 (e.g., an AP) may generate and transfer UL data to the NR PDCP entity 1011. The NR PDCP entity 1011 may identify information indicating whether the LTE block 1020 is in a DRX mode. If it is identified that the LTE block 1020 is in a DRX mode, the NR PDCP entity 1011 may transfer a PDU to the NR RLC entity 1012, irrespective of whether the size of the UL data is greater than or equal to an uplink data split threshold value. Accordingly, the UL data may be transmitted via the NR MAC entity 1013 and the NR PHY entity 1014, in operation 1037. If it is identified that the LTE block 1020 is not in a DRX mode, the NR PDCP entity 1011 may transfer the PDU to an LTE RLC entity 1022 when the size of the UL data is less than the uplink data split threshold value. Accordingly, the UL data may be transmitted to the outside via the LTE MAC entity 1023 and the LTE PHY entity 1024.

Figure 11:
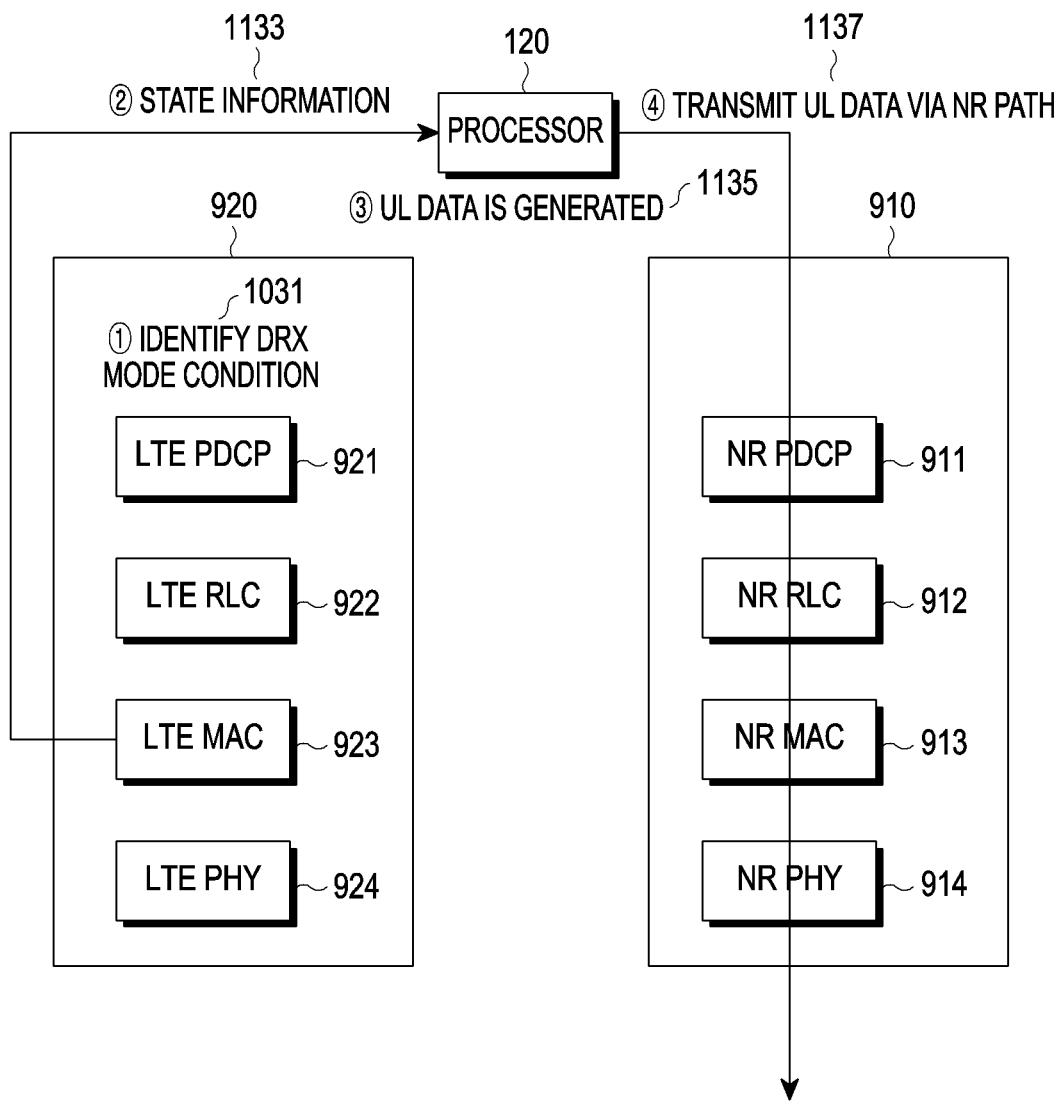
FIG. 11 is a diagram illustrating a structure of two communication processors according to an embodiment of the disclosure.

FIG. 11 is a diagram illustrating a structure of two communication processors according to an embodiment of the disclosure.

Referring to FIG. 11, the electronic device 101 according to various embodiments may include an NR communication processor 910 and an LTE communication processor 920. In operation 1131, the LTE communication processor 920 may identify that a DRX mode condition is incurred, and may enter a DRX mode. In operation 1133, the LTE communication processor 920 may transfer state information (e.g., a CDRX flag) to the processor 120 (e.g., an AP). The processor 120 may generate UL data in operation 1135. If the value of the DRX mode flag is a value indicating a DRX mode, the UL data may be transferred to the NR communication processor 910. In this instance, the processor 120 may identify that the NR communication processor 910 is in an activated state. The processor 120 may transmit the UL data via an NR path in operation 1137. For example, the UL data may be transferred to the NR communication processor 910, and may be transmitted via the NR PDCP entity 911, the NR RLC entity 912, the NR MAC entity 913, and the NR PHY entity 914. According to various embodiments, the processor 120 (e.g., an AP) may identify that the NR communication processor 910 and the LTE communication processor 920 are in a DRX mode. If a PDCP entity is included in the NR communication processor 910, the processor 120 may change the NR communication processor 910 into an activated state, and may transfer the UL data to the NR communication processor 910 for transmission.

Figure 12:
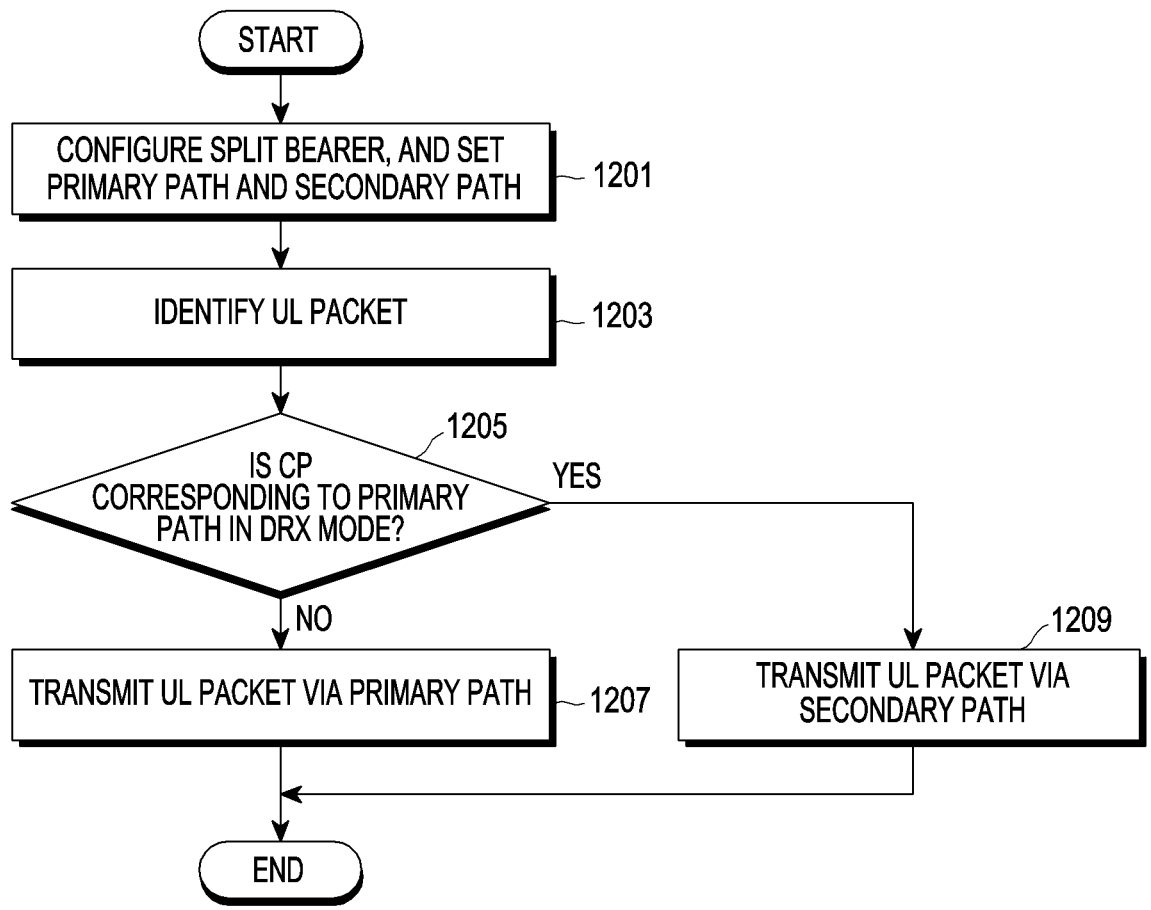
FIG. 12 is a flowchart illustrating an operation method of an electronic device according to an embodiment of the disclosure.

FIG. 12 is a flowchart illustrating an operation method of an electronic device according to an embodiment of the disclosure.

Referring to FIG. 12, according to various embodiments of the disclosure, the electronic device 101 (e.g., at least one of the first communication processor 212, the second communication processor 214, or the integrated communication processor 260) may configure a split bearer, and may set a primary path and a secondary path, in operation 1201. Based on the configuration of the split bearer, both first network communication and second network communication based on dual connectivity may be configured to be in a state capable of transmitting or receiving data. The electronic device 101 may identify a primary path for an uplink and a secondary path, based on, for example, a message (e.g., an RRC connection reconfiguration message) received from a network (e.g., an MN). At least one communication processor may identify a condition (e.g., an uplink data split threshold value) for using a secondary path.

According to various embodiments, in operation 1203, the electronic device 101 may identify a UL packet. For example, at least one communication processor may receive a UL packet from the processor 120 (e.g., an AP). The UL packet may be a packet corresponding to DL data that the electronic device 101 receives, or a packet which is irrelevant to DL data. The type of UL packet is not limited. In operation 1205, the electronic device 101 may identify whether a communication processor corresponding to the primary path is in a DRX mode. If it is identified that the communication processor corresponding to the primary path is not in a DRX mode in operation 1205 (No), the electronic device 101 may transmit the UL packet via the primary path in operation 1207. For example, if the size of the UL packet is less than the uplink data split threshold value, the at least one communication processor may use the primary path. For example, if the size of the UL packet is greater than or equal to the uplink data split threshold value, the electronic device 101 may additionally use the secondary path. If it is identified that the communication processor corresponding to the primary path is in a DRX mode in operation 1205 (Yes), the electronic device 101 may transmit the UL packet via the secondary path in operation 1209.

Figure 13:
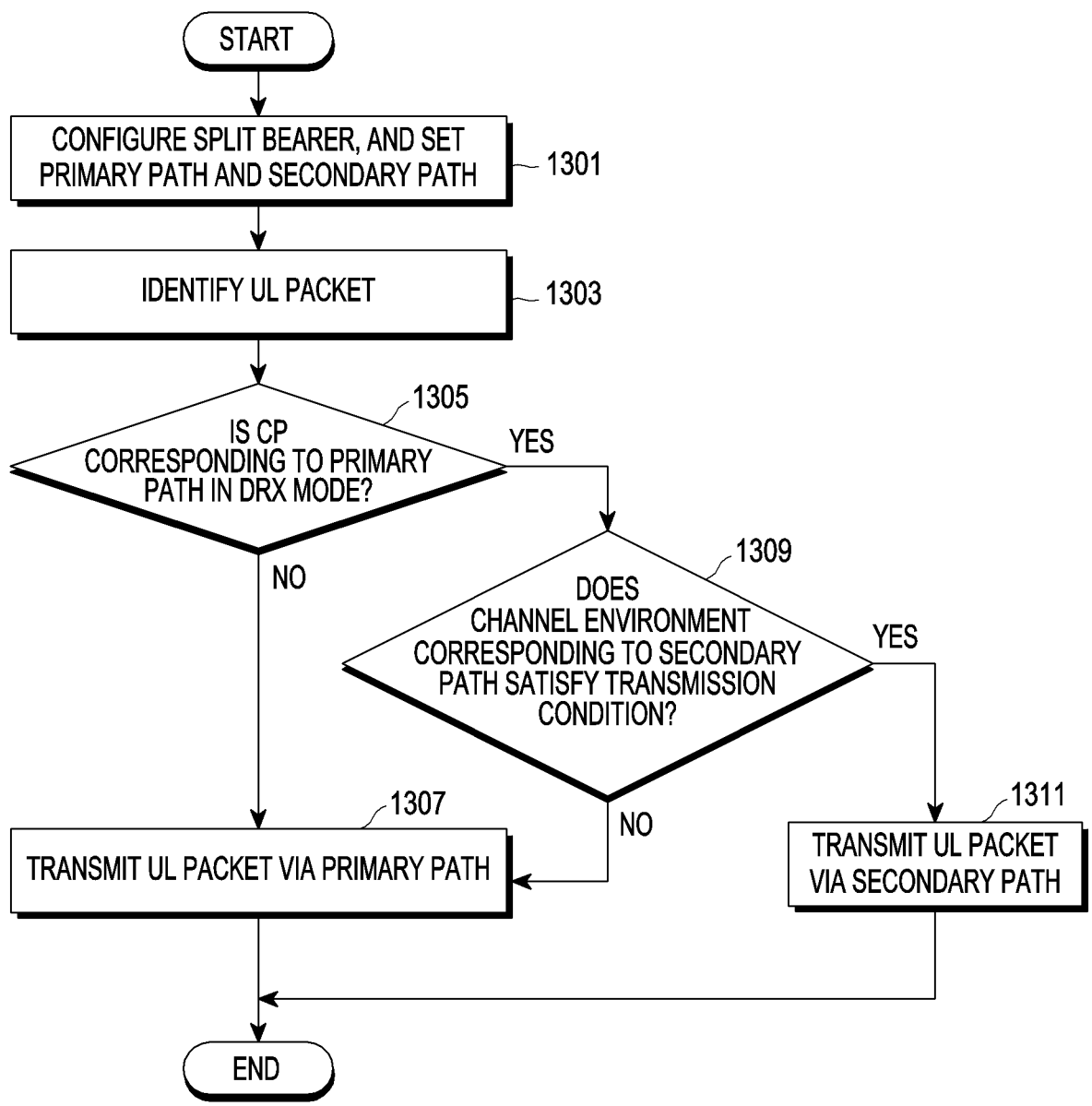
FIG. 13 is a flowchart illustrating an operation method of an electronic device according to an embodiment of the disclosure.

FIG. 13 is a flowchart illustrating an operation method of an electronic device according to an embodiment of the disclosure. Referring to FIG. 13, since operations 1301, 1303, and 1305 may be substantially the same as operations 1201, 1203, and 1205 of FIG. 12, respectively, descriptions thereof will be briefly provided.

According to various embodiments, the electronic device 101 (e.g., at least one of the first communication processor 212, the second communication processor 214, or the integrated communication processor 260) may configure a split bearer, and may set a primary path and a secondary path, in operation 1301. In operation 1303, the electronic device 101 may identify a UL packet. In operation 1305, the electronic device 101 may identify whether a CP corresponding to the primary path is in a DRX mode.

According to various embodiments, if it is identified that a communication processor corresponding to the primary path is not in a DRX mode in operation 1305 (No), the electronic device 101 may transmit the UL packet via the primary path in operation 1307. If it is identified that the communication processor corresponding to the primary path is in a DRX mode in operation 1305 (Yes), the electronic device 101 may identify whether a channel environment corresponding to the secondary path satisfies a transmission condition in operation 1309. The electronic device 101 may identify information indicating channel quality of the secondary path. For example, the electronic device 101 may receive, from a base station, information indicating the channel quality of the secondary path which is identified by the base station in response to a sounding reference signal (SRS) that the electronic device 101 transmits in advance. Alternatively, the electronic device 101 may identify information indicating the quality of a downlink channel, based on a reference signal (e.g., a channel state information reference signal) received from the base station. The electronic device 101 may predict the quality of an uplink channel, based on the quality of the downlink channel, by using channel reciprocity. The electronic device 101 may identify whether the channel environment satisfies a transmission condition, based on whether information (reference signal received power (RSRP), reference signal received quality (RSRQ), and/or signal-to-interference-plus-noise ratio (SINR)) indicating channel quality is greater than or equal to a predetermined threshold value. If it is identified that the channel environment does not satisfy the transmission condition in operation 1309 (No), the electronic device 101 may transmit the UL packet via the primary path. The electronic device 101 may wake up the communication processor corresponding to the primary path, and may transmit the UL packet via the communication processor that wakes up. If it is identified that the channel environment satisfies the transmission condition in operation 1309 (Yes), the electronic device 101 may transmit the UL packet via the secondary path in operation 1311. Accordingly, if it is determined that the channel quality of the secondary path is poor, the communication processor corresponding to the primary path, which has been in the DRX mode, may be woken up for stability of communication.

Figure 14:
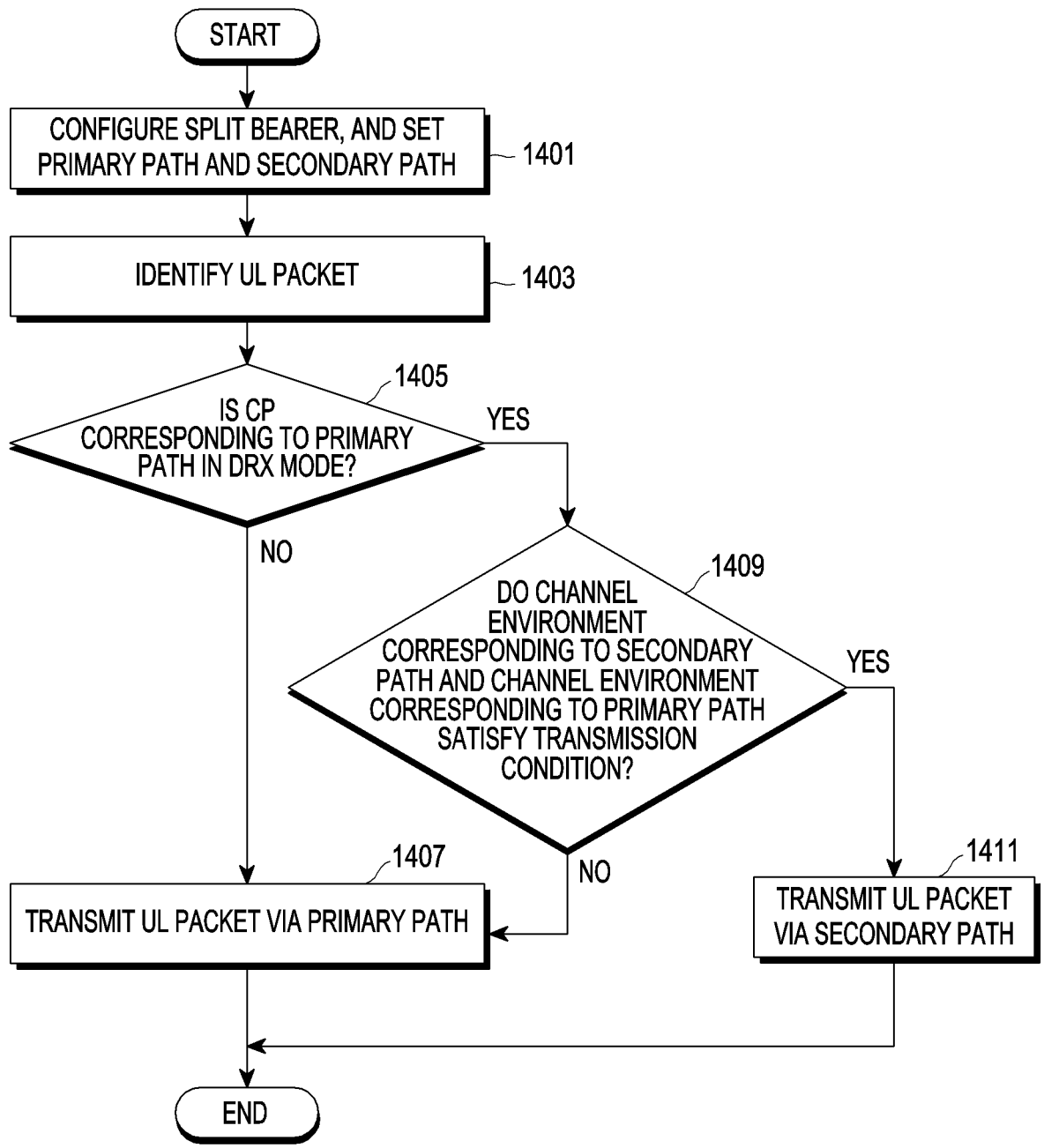
FIG. 14 is a flowchart illustrating an operation method of an electronic device according to an embodiment of the disclosure.

FIG. 14 is a flowchart illustrating an operation method of an electronic device according to an embodiment of the disclosure. Referring to FIG. 14, since operations 1401, 1403, and 1405 may be substantially the same as operations 1201, 1203, and 1205 of FIG. 12, respectively, descriptions thereof will be briefly provided.

According to various embodiments, the electronic device 101 (e.g., at least one of the first communication processor 212, the second communication processor 214, or the integrated communication processor 260) may configure a split bearer, and may set a primary path and a secondary path, in operation 1401. In operation 1403, the electronic device 101 may identify a UL packet. In operation 1405, the electronic device 101 may identify whether a communication processor corresponding to the primary path is in a DRX mode.

According to various embodiments, if it is identified that the communication processor corresponding to the primary path is not in a DRX mode in operation 1405 (No), the electronic device 101 may transmit the UL packet via the primary path in operation 1407. If it is identified that the communication processor corresponding to the primary path is in a DRX mode in operation 1405 (Yes), the electronic device 101 may identify whether a channel environment corresponding to the secondary path and a channel environment corresponding to the primary path satisfy a transmission condition in operation 1409. If it is identified that the channel environment corresponding to the secondary path and the channel environment corresponding to the primary path do not satisfy the transmission condition in operation 1409 (No), the electronic device 101 may determine to transmit the UL packet via the primary path. If it is identified that the channel environment corresponding to the secondary path and the channel environment corresponding to the primary path satisfy the transmission condition in operation 1409 (Yes), the electronic device 101 may determine to transmit the UL packet via the secondary path in operation 1411. For example, based on whether channel information corresponding to the primary path is less than or equal to a first threshold value, the electronic device 101 may determine whether to transmit the UL packet via the secondary path. For example, based on whether channel information corresponding to the secondary path exceeds a second threshold value, the electronic device 101 may determine whether to transmit the UL packet via the secondary path. For example, based on whether the difference between the channel information corresponding to the secondary path and the channel information corresponding to the primary path exceeds a third threshold value, the electronic device 101 may determine whether to transmit the UL packet via the secondary path. The electronic device 101 may select a path via which the UL packet is to be transmitted, based on a combination of at least one of the above described conditions.

Figure 15:
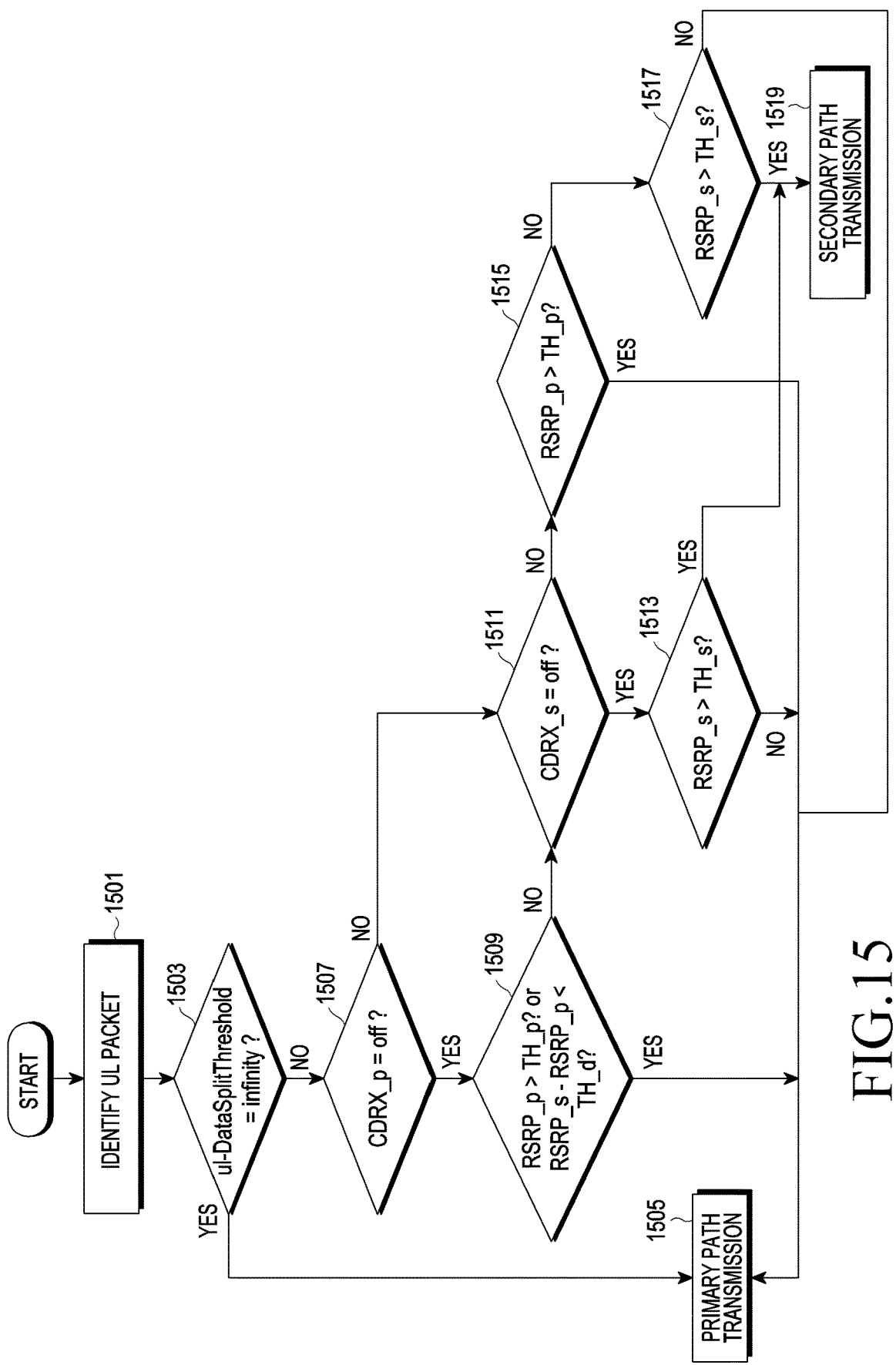
FIG. 15 is a flowchart illustrating an operation method of an electronic device according to an embodiment of the disclosure.

FIG. 15 is a flowchart illustrating an operation method of an electronic device according to an embodiment of the disclosure.

Referring to FIG. 15, according to various embodiments of the disclosure, the electronic device 101 (e.g., at least one of the first communication processor 212, the second communication processor 214, or the integrated communication processor 260) may identify a UL packet in operation 1501. In operation 1503, the electronic device 101 may identify whether an uplink data split threshold (ul-datasplitthreshold) is infinity. If the uplink data split threshold value is infinity in operation 1503 (Yes), the electronic device 101 may transmit UL data via a primary path in operation 1505. However, operation 1503 is merely an example. According to various embodiments, in a DRX mode, entity corresponding to a secondary path may transmit UL data. The electronic device 101 may wake up a communication processor which corresponds to the primary path, and is in the DRX mode, and may transmit the UL data. If the uplink data split threshold is not infinity in operation 1503 (No), the electronic device 101 may identify whether a DRX mode (CDRX_p) in the primary path is in an off-state in operation 1507. If the DRX mode (CDRX_p) in the primary path is in an on-state in operation 1507 (No), the electronic device 101 may identify whether an RSRP (RSRP_p) in the primary path exceeds a primary path threshold value (TH_p) or whether the difference between an RSRP (RSRP_s) in the secondary path and the RSRP (RSRP_p) in the primary path is less than a threshold difference (TH_d) in operation 1509. If the RSRP (RSRP_p) of the primary path exceeds the primary path threshold value (TH_p), or if the difference between the RSRP (RSRP_s) of the secondary path and the RSRP (RSRP_p) of the primary path is less than the threshold difference (TH_d) in operation 1509 (Yes), the electronic device 101 may transmit the UL data via the primary path. If the DRX mode (CDRX_p) of the primary path is in an off-state in operation 1507 (No), the electronic device 101 may identify whether the DRX mode (CDRX_s) of the secondary path is in an off-state in operation 1511. If the RSRP (RSRP_p) of the primary path does not exceed the primary path threshold value (TH_p), or if the difference between the RSRP (RSRP_s) of the secondary path and the RSRP (RSRP_p) of the primary path is greater than or equal to the threshold difference (TH_d) in operation 1509 (No), the electronic device 101 may identify whether the DRX mode (CDRX_s) of the secondary path is in an off-state in operation 1511. If it is identified that the DRX mode (CDRX_s) of the secondary path is in an off-state in operation 1511 (Yes), the electronic device 101 may identify whether the RSRP (RSRP_s) of the secondary path exceeds a secondary path threshold value (TH_s) in operation 1513. If it is identified that the RSRP (RSRP_s) of the secondary path does not exceed the secondary path threshold value (TH_s) in operation 1513 (No), the electronic device 101 may transmit the UL data via the primary path. According to another embodiment, the electronic device 101 may additionally identify whether the difference between the RSRP (RSRP_s) of the secondary path and the RSRP (RSRP_p) of the primary path exceeds the threshold difference (TH_d), based on, for example, an "OR" condition, in operation 1513.

Referring again to operation 1511, according to various embodiments, if it is identified that the DRX mode (CDRX_s) of the secondary path is in an on-state in operation 1511 (No), the electronic device 101 may identify whether the RSRP (RSRP_p) of the primary path exceeds the primary path threshold value (TH_p) in operation 1515. If it is identified that the RSRP (RSRP_p) of the primary path exceeds the primary path threshold value (TH_p) in operation 1515 (Yes), the electronic device 101 may transmit the UL data via the primary path. If it is identified that the RSRP (RSRP_p) of the primary path is less than or equal to the primary path threshold value (TH_p) in operation 1515 (No), the electronic device 101 may identify whether the RSRP (RSRP_s) of the secondary path exceeds the secondary path threshold value (TH_s) in operation 1517. If it is identified that the RSRP (RSRP_s) of the secondary path exceeds the secondary threshold value (TH_s) in operation 1517 (Yes), the electronic device 101 may transmit the UL data via the secondary path in operation 1519. In this instance, the entity in the primary path may maintain the DRX mode. If it is identified that the RSRP (RSRP_s) of the secondary path is less than or equal to the secondary path threshold value (TH_s) in operation 1517 (No), the electronic device 101 may transmit the UL data via the secondary path in operation 1519. With reference to operation 1513 again, if it is identified that the RSRP (RSRP_s) of the secondary path exceeds the secondary path threshold value (TH_s) in operation 1513 (Yes), the electronic device 101 may transmit the UL data via the secondary path. The order of operations in the algorithm of FIG. 15 is merely an example, and those skilled in the art may understand that the order is not limited and may be changeable.

Figure 16:
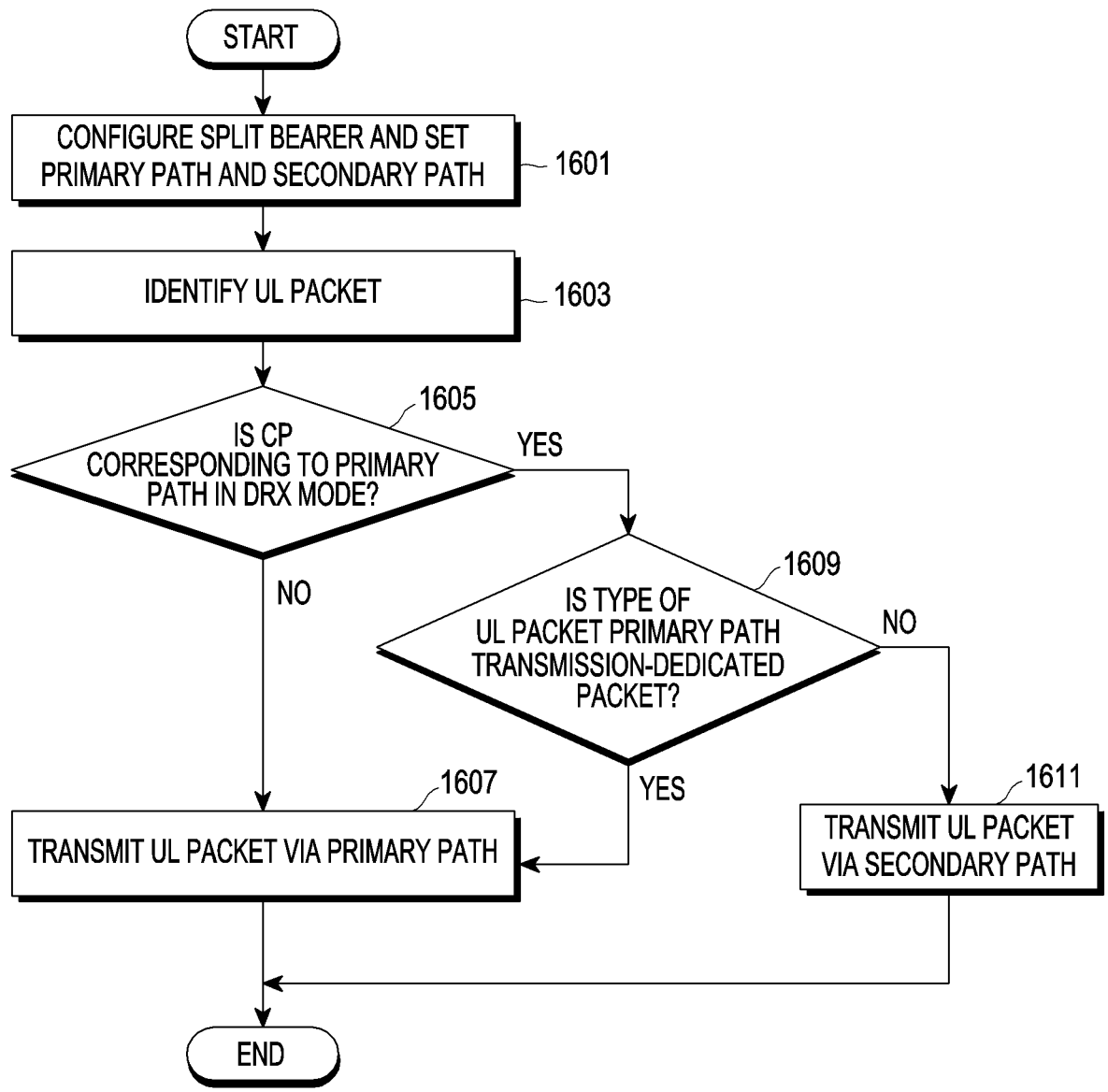
FIG. 16 is a flowchart illustrating an operation method of an electronic device according to an embodiment of the disclosure.

FIG. 16 is a flowchart illustrating an operation method of an electronic device according to an embodiment of the disclosure.

Referring to FIG. 16, according to various embodiments of the disclosure, the electronic device 101 (e.g., at least one of the first communication processor 212, the second communication processor 214, or the integrated communication processor 260) may configure a split bearer, and may set a primary path and a secondary path, in operation 1601. In operation 1603, the electronic device 101 may identify a UL packet.

For example, at least one communication processor may receive a UL packet from the processor 120 (e.g., an AP). The UL packet may be a packet corresponding to DL data that the electronic device 101 receives, or a packet which is irrelevant to DL data.

In operation 1605, the electronic device 101 may identify whether a communication processor corresponding to the primary path is in a DRX mode. If it is identified that the communication processor corresponding to the primary path is not in a DRX mode in operation 1605 (No), the electronic device 101 may transmit the UL packet via the primary path in operation 1607.

On the other hand, if it is identified that the communication processor corresponding to the primary path is in a DRX mode in operation 1605 (Yes), the electronic device 101 may identify whether the type of UL packet is a primary path transmission-dedicated packet, in operation 1609. If it is identified that the type of UL packet is the primary path transmission-dedicated packet in operation 1609 (Yes), the electronic device 101 may wake up the communication processor corresponding to the primary path and may transmit the UL packet via the primary path. If it is identified that type of UL packet is different from the primary path transmission-dedicated packet in operation 1609 (No), the electronic device 101 may transmit the UL packet via the secondary path in operation 1611. The electronic device 101 may classify the type of packet as a primary path transmission-dedicated packet or a packet that is transmittable via the secondary path. For example, a UL ACK packet corresponding to DL data may be configured not to be a primary path transmission-dedicated packet.

Figure 17:
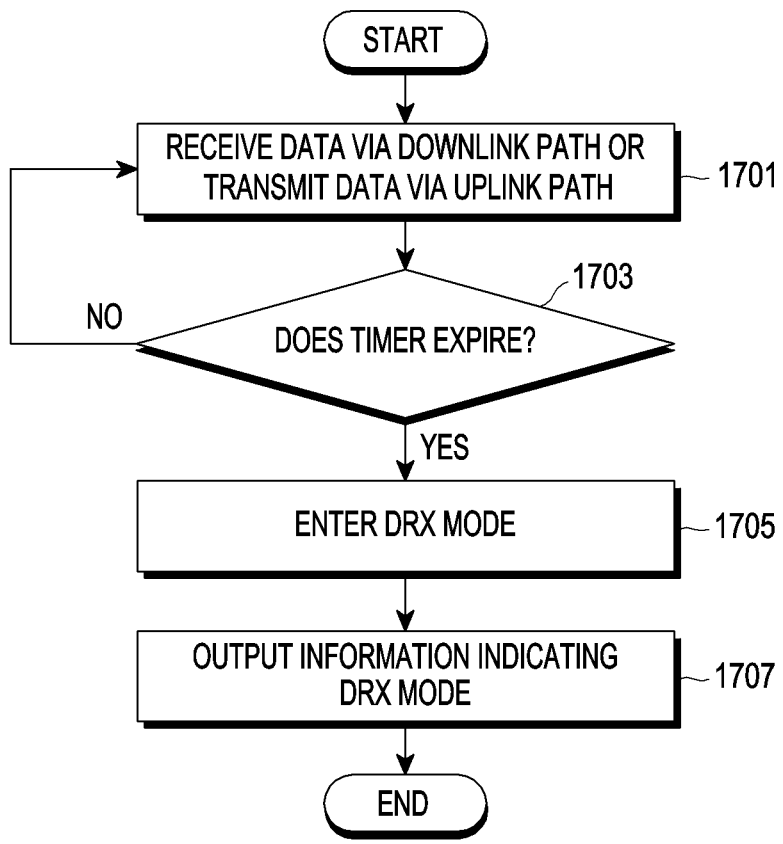
FIG. 17 is a flowchart illustrating an operation of a communication processor according to an embodiment of the disclosure.

FIG. 17 is a flowchart illustrating an operation of a communication processor according to an embodiment of the disclosure.

Referring to FIG. 17, a communication processor according to various embodiments (e.g., at least one of the first communication processor 212, the second communication processor 214, or the integrated communication processor 260) may identify data reception via a downlink path or data transmission via an uplink path in operation 1701. For example, the communication processor may identify data reception via a downlink path or data transmission via an uplink path, by performing PDCCH monitoring. If the data reception via the downlink path or data transmission via uplink path is identified, the communication processor may restart a timer. In operation 1703, the communication processor may identify whether a timer (e.g., DRX inactivity timer) expires. If data reception via the downlink path or data transmission via the uplink path is not identified until the timer expires in operation 1703 (Yes), the communication processor may enter a DRX mode in operation 1705. On the other hand, if it is determined in operation 1703 that the timer does not expire, the process returns to operation 1701. In operation 1707, the communication processor may output information indicating a DRX mode to another processor (e.g., an AP and/or CP). For example, the communication processor may periodically output information indicating whether the state is a DRX mode to another communication processor. For example, the communication processor may output information indicating whether the state is a DRX mode to another communication processor when the state is changed from a DRX mode to an activated mode, or when the state is changed from an activated state to a DRX mode.

An Example 1 of the disclosure may be an electronic device, wherein the electronic device may include a first communication processor configured to support first network communication with a first network, and a second communication processor configured to support second network communication with a second network, which is different from the first network, wherein, if both the first network communication and the second network communication are configured to be in a state capable of transmitting data, when the second communication processor is in a DRX mode, the first communication processor is configured to identify an uplink packet to be transmitted, and transmit the uplink packet using the first network communication, based on identifying that the second communication processor is in the DRX mode, and the second communication processor maintains the DRX mode, while the uplink packet is transmitted.

An Example 2 may be an electronic device in accordance with example 1, or with any other example described herein, wherein the first communication processor may be configured to set the second network communication as a primary path for an uplink, set the first network communication as a secondary path for the uplink, and in the state in which the second communication processor is in an activated state, transmit the uplink packet using only the second network communication if a size of the uplink packet is less than a threshold value, and transmit the uplink packet using only the second communication or using the first network communication and the second network communication together if the size of the uplink packet is greater than or equal to the threshold value.

An Example 3 may be an electronic device in accordance with example 1 or example 2, or with any other example described herein, wherein in the state in which the first communication processor is in the activated state, the first communication processor may be configured to disregard whether the size of the uplink packet is greater than or equal to the threshold value, and to transmit the uplink packet using the first network communication.

An Example 4 may be an electronic device in accordance with example 1 to example 3, or with any other example described herein, wherein the uplink packet may be data corresponding to reception data that the first communication processor receives, or data which is independent from the reception data.

An Example 5 may be an electronic device in accordance with example 1 to example 4, or with any other example described herein, wherein the first communication processor may be further configured to receive information indicating whether the second communication processor is in the DRX mode, from the second communication processor.

An Example 6 may be an electronic device in accordance with example 1 to example 5, or with any other example described herein, wherein, a PDCP entity corresponding to the first network communication may be configured to receive the information indicating whether the second communication processor is in the DRX mode, from a MAC entity corresponding to the second network communication.

An Example 7 may be an electronic device in accordance with example 1 to example 6, or with any other example described herein, wherein, the first communication processor may be configured to determine whether to transmit the uplink packet using the first network communication if the second communication processor is in the DRX mode, based on at least one of a first communication environment of the first network communication or a second communication environment of the second network communication.

An Example 8 may be an electronic device in accordance with example 1 to example 7, or with any other example described herein, wherein, as at least a part of the determining whether to transmit the uplink packet using the first network communication if the second communication processor is in the DRX mode, based on at least one of the first communication environment of the first network communication or the second communication environment of the second network communication, the first communication processor may be configured to determine whether to transmit the uplink packet using the first network communication if the second communication processor is in the DRX mode, based on at least one of whether first information indicating the first communication environment exceeds a first threshold value, whether second information indicating the second communication environment is less than a second threshold value, or whether a difference between the first information and the second information is greater than or equal to a third threshold value.

An Example 9 may be an electronic device in accordance with example 1 to example 8, or with any other example described herein, wherein, if it is determined not to perform the uplink packet transmission using the first network communication when the second communication processor is in the DRX mode, based on at least one of the first communication environment of the first network communication or the second communication environment of the second network communication, the second communication processor may be configured to be changed from the DRX mode to an activated state, and to transmit the uplink packet using the second network communication.

An Example 10 may be an electronic device in accordance with example 1 to example 9, or with any other example described herein, wherein, the first communication processor may be configured to determine whether to transmit the uplink packet using the first network communication if the second communication processor is in the DRX mode, based on a type of uplink packet.

An Example 11 of the disclosure may be an operation method, wherein the operation method of a first communication processor that supports first network communication with a first network may include if both the first network communication and second network communication, which is different from the first network communication and is supported by an electronic device including the first communication processor, are configured to be in a state capable of transmitting data, receiving an uplink packet from an application processor, receiving information indicating that a second communication processor that supports the second network communication is in a DRX mode, and transmitting the uplink packet using the first network communication, based on identifying that the second communication processor is in the DRX mode.

An Example 12 may be an operation method in accordance with example 11, or with any other example described herein, wherein, the operation method of the first communication processor may further include setting the second network communication as a primary path for an uplink, setting the first network communication as a secondary path for the uplink, and in the state in which the second communication processor is an activated state, transmitting the uplink packet using only the second network communication if a size of the uplink packet is less than a threshold value, and transmitting the uplink packet using only the second network communication or using the first network communication and the second network communication together if the size of the uplink packet is greater than or equal to the threshold value.

An Example 13 may be an operation method in accordance with example 11 or example 12, or with any other example described herein, wherein, the operation of transmitting the uplink packet using the first network communication may include in the state in which the first communication processor is in the activated state, disregarding whether the size of the uplink packet is greater than or equal to the threshold value, and transmitting the uplink packet using the first network communication.

An Example 14 may be an operation method in accordance with example 11 to example 13, or with any other example described herein, wherein, the uplink packet may be data corresponding to reception data that the first communication processor receives, or data independent from the reception data.

An Example 15 may be an operation method in accordance with example 11 to example 14, or with any other example described herein, wherein, a PDCP entity corresponding to the first network communication may receive information indicating whether the second communication processor is in the DRX mode, from a MAC entity corresponding to the second network communication.

An Example 16 may be an operation method in accordance with example 11 to example 15, or with any other example described herein, wherein, the operation method of the first communication processor may further include determining whether to transmit the uplink packet using the second network communication if the second communication processor is in the DRX mode, based on at least one of a first communication environment of the first network communication or a second communication environment of the second network communication.

An Example 17 may be an operation method in accordance with example 11 to example 16, or with any other example described herein, wherein, the operation of determining whether to transmit the uplink packet using the second network communication may include determining whether to transmit the uplink packet using the second network communication if the second communication processor is in the DRX mode, based on at least one of whether first information indicating the first communication environment exceeds a first threshold value, whether second information indicating the second communication environment is less than a second threshold value, or a difference between the first information and the second information is greater than or equal to a third threshold value.

An Example 18 may be an operation method in accordance with example 11 to example 17, or with any other example described herein, wherein, the operation method of the first communication processor may further include determining whether to transmit the uplink packet using the second network communication if the second communication processor is in the DRX mode, based on a type of uplink packet.

An Example 19 of the disclosure may be an operation method, wherein the operation method of a communication processor may include maintaining a sleep state during a first period of time, and entering a DRX mode for performing PDCCH monitoring during a second period of time, in response to failure of detection of transmission/reception permission associated with transmission data and/or reception data in a PDCCH during a designated period of time, outputting information indicating that a state of the communication processor is the DRX mode, to the outside, in response to entry to the DRX mode, changing the state of the communication processor from the DRX mode to an activated state, based on detection of transmission/reception permission associated with transmission data and/or reception data according to a result of performing PDCCH monitoring during the second period of time of a DRX, and outputting information indicating that the state of the communication processor is the activated state, to the outside.

An Example 20 may be an operation method in accordance with example 19, or with any other example described herein, wherein, the information indicating that the state of the communication processor is the DRX mode or the information indicating that the state of the communication processor is the activated state may be output periodically, or may be output based on changing of the state of the communication processor.

An Example 21 of the disclosure may be an electronic device, wherein the electronic device may include a first communication means (e.g., a communication processor, a modem, a communication circuitry, etc.) configured to support first network communication with a first network, and a second communication means (e.g., a communication processor, a modem, a communication circuitry, etc.) configured to support second network communication with a second network, which is different from the first network, wherein, if both the first network communication and the second network communication are configured to be in a state capable of transmitting data, when the second communication means is in a DRX mode, the first communication means is configured to identify an uplink packet to be transmitted, and transmit the uplink packet using the first network communication, based on identifying that the second communication means is in the DRX mode, and the second communication means maintains the DRX mode, while the uplink packet is transmitted.

An Example 22 may be an electronic device in accordance with example 21, or with any other example described herein, wherein the first communication means may be configured to set the second network communication as a primary path for an uplink, set the first network communication as a secondary path for the uplink, and in the state in which the second communication means is in an activated state, transmit the uplink packet using only the second network communication if a size of the uplink packet is less than a threshold value, and transmit the uplink packet using only the second communication or using the first network communication and the second network communication together if the size of the uplink packet is greater than or equal to the threshold value.

An Example 23 may be an electronic device in accordance with example 21 or example 22, or with any other example described herein, wherein in the state in which the first communication means is in the activated state, the first communication means may be configured to disregard whether the size of the uplink packet is greater than or equal to the threshold value, and to transmit the uplink packet using the first network communication.

An Example 24 may be an electronic device in accordance with example 21 to example 23, or with any other example described herein, wherein the uplink packet may be data corresponding to reception data that the first communication means receives, or data which is independent from the reception data.

An Example 25 may be an electronic device in accordance with example 21 to example 24, or with any other example described herein, wherein the first communication means may be further configured to receive information indicating whether the second communication means is in the DRX mode, from the second communication means.

An Example 26 may be an electronic device in accordance with example 21 to example 25, or with any other example described herein, wherein, a PDCP entity corresponding to the first network communication may be configured to receive the information indicating whether the second communication means is in the DRX mode, from a MAC entity corresponding to the second network communication.

An Example 27 may be an electronic device in accordance with example 21 to example 26, or with any other example described herein, wherein, the first communication means may be configured to determine whether to transmit the uplink packet using the first network communication if the second communication means is in the DRX mode, based on at least one of a first communication environment of the first network communication or a second communication environment of the second network communication.

An Example 28 may be an electronic device in accordance with example 21 to example 27, or with any other example described herein, wherein, as at least a part of the determining whether to transmit the uplink packet using the first network communication if the second communication means is in the DRX mode, based on at least one of the first communication environment of the first network communication or the second communication environment of the second network communication, the first communication means may be configured to determine whether to transmit the uplink packet using the first network communication if the second communication means is in the DRX mode, based on at least one of whether first information indicating the first communication environment exceeds a first threshold value, whether second information indicating the second communication environment is less than a second threshold value, or whether a difference between the first information and the second information is greater than or equal to a third threshold value.

An Example 29 may be an electronic device in accordance with example 21 to example 28, or with any other example described herein, wherein, if it is determined not to perform the uplink packet transmission using the first network communication when the second communication means is in the DRX mode, based on at least one of the first communication environment of the first network communication or the second communication environment of the second network communication, the second communication means may be configured to be changed from the DRX mode to an activated state, and to transmit the uplink packet using the second network communication.

An Example 30 may be an electronic device in accordance with example 21 to example 29, or with any other example described herein, wherein, the first communication means may be configured to determine whether to transmit the uplink packet using the first network communication if the second communication means is in the DRX mode, based on a type of uplink packet.

An Example 31 of the disclosure may be an operation method, wherein the operation method of a first communication means that supports first network communication with a first network may include if both the first network communication and second network communication, which is different from the first network communication and is supported by an electronic device including the first communication means, are configured to be in a state capable of transmitting data, receiving an uplink packet from an application processor; receiving information indicating that a second communication means that supports the second network communication is in a DRX mode; and transmitting the uplink packet using the first network communication, based on identifying that the second communication means is in the DRX mode.

An Example 32 may be an operation method in accordance with example 31, or with any other example described herein, wherein, the operation method of the first communication means may further include setting the second network communication as a primary path for an uplink, setting the first network communication as a secondary path for the uplink; and in the state in which the second communication means is an activated state, transmitting the uplink packet using only the second network communication if a size of the uplink packet is less than a threshold value, and transmitting the uplink packet using only the second network communication or using the first network communication and the second network communication together if the size of the uplink packet is greater than or equal to the threshold value.

An Example 33 may be an operation method in accordance with example 31 or example 32, or with any other example described herein, wherein, the operation of transmitting the uplink packet using the first network communication may include in the state in which the first communication means is in the activated state, disregarding whether the size of the uplink packet is greater than or equal to the threshold value, and transmitting the uplink packet using the first network communication.

An Example 34 may be an operation method in accordance with example 31 to example 33, or with any other example described herein, wherein, the uplink packet may be data corresponding to reception data that the first communication means receives, or data independent from the reception data.

An Example 35 may be an operation method in accordance with example 31 to example 34, or with any other example described herein, wherein, a PDCP entity corresponding to the first network communication may receive information indicating whether the second communication means is in the DRX mode, from a MAC entity corresponding to the second network communication.

An Example 36 may be an operation method in accordance with example 31 to example 35, or with any other example described herein, wherein, the operation method of the first communication means may further include determining whether to transmit the uplink packet using the second network communication if the second communication means is in the DRX mode, based on at least one of a first communication environment of the first network communication or a second communication environment of the second network communication.

An Example 37 may be an operation method in accordance with example 31 to example 36, or with any other example described herein, wherein, the operation of determining whether to transmit the uplink packet using the second network communication may include determining whether to transmit the uplink packet using the second network communication if the second communication means is in the DRX mode, based on at least one of whether first information indicating the first communication environment exceeds a first threshold value, whether second information indicating the second communication environment is less than a second threshold value, or a difference between the first information and the second information is greater than or equal to a third threshold value.

An Example 38 may be an operation method in accordance with example 31 to example 37, or with any other example described herein, wherein, the operation method of the first communication means may further include determining whether to transmit the uplink packet using the second network communication if the second communication means is in the DRX mode, based on a type of uplink packet.

An Example 39 of the disclosure may be an operation method, wherein the operation method of a communication means may include maintaining a sleep state during a first period of time, and entering a DRX mode for performing PDCCH monitoring during a second period of time, in response to failure of detection of transmission/reception permission associated with transmission data and/or reception data in a PDCCH during a designated period of time, outputting information indicating that a state of the communication means is the DRX mode, to the outside, in response to entry to the DRX mode; changing the state of the communication means from the DRX mode to an activated state, based on detection of transmission/reception permission associated with transmission data and/or reception data according to a result of performing PDCCH monitoring during the second period of time of a DRX, and outputting information indicating that the state of the communication means is the activated state, to the outside.

An Example 40 may be an operation method in accordance with example 39, or with any other example described herein, wherein, the information indicating that the state of the communication means is the DRX mode or the information indicating that the state of the communication means is the activated state may be output periodically, or may be output based on changing of the state of the communication means.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program) including one or more instructions that are stored in a storage medium (e.g., internal memory or external memory) that is readable by a machine (e.g., a master device or a task performing device). For example, a processor of the machine (e.g., a master device or a task performing device) may invoke at least one of the one or more instructions stored in the storage medium, and execute it. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components or operations may be omitted, or one or more other components or operations may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

The scope of protection is defined by the appended independent claims. Further features are specified by the appended dependent claims. Example implementations can be realized comprising one or more features of any claim taken jointly and severally in any and all permutations.

The examples described in this disclosure include non-limiting example implementations of components corresponding to one or more features specified by the appended independent claims and these features (or their corresponding components) either individually or in combination may contribute to ameliorating one or more technical problems deducible by the skilled person from this disclosure.

Furthermore, one or more selected component of any one example described in this disclosure may be combined with one or more selected component of any other one or more example described in this disclosure, or alternatively may be combined with features of an appended independent claim to form a further alternative example.

Further example implementations can be realized comprising one or more components of any herein described implementation taken jointly and severally in any and all permutations. Yet further example implementations may also be realized by combining features of one or more of the appended claims with one or more selected components of any example implementation described herein.

In forming such further example implementations, some components of any example implementation described in this disclosure may be omitted. The one or more components that may be omitted are those components that the skilled person would directly and unambiguously recognize as being not, as such, indispensable for the function of the present technique in the light of a technical problem discernible from this disclosure. The skilled person would recognize that replacement or removal of such an omitted components does not require modification of other components or features of the further alternative example to compensate for the change. Thus further example implementations may be included, according to the present technique, even if the selected combination of features and/or components is not specifically recited in this disclosure.

Two or more physically distinct components in any described example implementation of this disclosure may alternatively be integrated into a single component where possible, provided that the same function is performed by the single component thus formed. Conversely, a single component of any example implementation described in this disclosure may alternatively be implemented as two or more distinct components to achieve the same function, where appropriate.

While the disclosure has been shown and described with reference to various embodiments thereof, it will be understood by those skilled in the art that various changes in form and details may be made therein without departing from the spirit and scope of the disclosure as defined by the appended claims and their equivalents.

The invention claimed is:

1. An electronic device comprising:
a first communication processor configured to support a first network communication with a first network; and
a second communication processor configured to support a second network communication with a second network, which is different from the first network,
wherein, if both the first network communication and the second network communication are configured to be in a state capable of transmitting data, when the second communication processor is in a discontinuous reception (DRX) mode, the first communication processor is configured to:
identify an uplink packet to be transmitted, and
transmit the uplink packet using the first network communication, based on identifying that the second communication processor is in the DRX mode, and the second communication processor maintains the DRX mode, while the uplink packet is transmitted.

2. The electronic device of claim 1, wherein the first communication processor is further configured to:
set the second network communication as a primary path for an uplink,
set the first network communication as a secondary path for the uplink,
in a state in which the second communication processor is in an activated state, transmit the uplink packet using only the second network communication if a size of the uplink packet is less than a threshold value, and
transmit the uplink packet using only the second network communication or using the first network communication and the second network communication together if the size of the uplink packet is greater than or equal to the threshold value.

3. The electronic device of claim 1, wherein, in a state in which the second communication processor is in an activated state, the first communication processor is further configured to:
disregard whether a size of the uplink packet is greater than or equal to a threshold value, and
transmit the uplink packet using the first network communication.

4. The electronic device of claim 1, wherein the uplink packet is data corresponding to reception data that the first communication processor receives, or data which is independent from the reception data.

5. The electronic device of claim 1, wherein the first communication processor is further configured to receive information indicating whether the second communication processor is in the DRX mode, from the second communication processor.

6. The electronic device of claim 5, wherein a packet data convergence protocol (PDCP) entity corresponding to the first network communication is further configured to receive the information indicating whether the second communication processor is in the DRX mode, from a medium access control (MAC) entity corresponding to the second network communication.

7. The electronic device of claim 1, wherein the first communication processor is further configured to determine whether to transmit the uplink packet using the first network communication if the second communication processor is in the DRX mode, based on at least one of a first communication environment of the first network communication or a second communication environment of the second network communication.

8. The electronic device of claim 7, wherein, as at least a part of the determining whether to transmit the uplink packet using the first network communication if the second communication processor is in the DRX mode, based on at least one of the first communication environment of the first network communication or the second communication environment of the second network communication, the first communication processor is configured to determine:
whether to transmit the uplink packet using the first network communication if the second communication processor is in the DRX mode, based on at least one of whether first information indicating the first communication environment exceeds a first threshold value,
whether second information indicating the second communication environment is less than a second threshold value, or
whether a difference between the first information and the second information is greater than or equal to a third threshold value.

9. The electronic device of claim 7, wherein, when it is determined not to perform the uplink packet transmission using the first network communication when the second communication processor is in the DRX mode, based on at least one of the first communication environment of the first network communication or the second communication environment of the second network communication, the second communication processor is further configured to be changed from the DRX mode to an activated state, and to transmit the uplink packet using the second network communication.

10. The electronic device of claim 1, wherein the first communication processor is further configured to determine whether to transmit the uplink packet using the first network communication if the second communication processor is in the DRX mode, based on a type of uplink packet.

11. A method of operating a first communication processor that supports a first network communication with a first network, the method comprising:
if both the first network communication and a second network communication, which is different from the first network communication and is supported by an electronic device including the first communication processor, are configured to be in a state capable of transmitting data:
receiving an uplink packet from an application processor;

receiving information indicating that a second communication processor that supports the second network communication is in a discontinuous reception (DRX) mode; and transmitting the uplink packet using the first network communication, based on identifying that the second communication processor is in the DRX mode.

12. The method of claim 11, further comprising:

setting the second network communication as a primary path for an uplink;

setting the first network communication as a secondary path for the uplink;

in a state in which the second communication processor is an activated state, transmitting the uplink packet using only the second network communication if a size of the uplink packet is less than a threshold value; and transmitting the uplink packet using only the second network communication or using the first network communication and the second network communication together if the size of the uplink packet is greater than or equal to the threshold value.

13. The method of claim 12, wherein the transmitting the uplink packet using the first network communication comprises:

in the state in which the first communication processor is in the activated state, disregarding whether the size of the uplink packet is greater than or equal to the threshold value; and transmitting the uplink packet using the first network communication.

14. The method of claim 11, wherein the uplink packet is data corresponding to reception data that the first communication processor receives, or data independent from the reception data.

15. The method of claim 11, wherein a packet data convergence protocol (PDCP) entity corresponding to the first network communication receives information indicating whether the second communication processor is in the DRX mode, from a medium access control (MAC) entity corresponding to the second network communication.

16. The method of claim 11, further comprising:

determining whether to transmit the uplink packet using the second network communication if the second communication processor is in the DRX mode, based on at least one of a first communication environment of the first network communication or a second communication environment of the second network communication.

17. The method of claim 16, wherein the determining whether to transmit the uplink packet using the second network communication comprises:

determining whether to transmit the uplink packet using the second network communication if the second communication processor is in the DRX mode, based on at least one of whether first information indicating the first communication environment exceeds a first threshold value, whether second information indicating the second communication environment is less than a second threshold value, or a difference between the first information and the second information is greater than or equal to a third threshold value.

18. The method of claim 11, further comprising:

determining whether to transmit the uplink packet using the second network communication if the second communication processor is in the DRX mode, based on a type of uplink packet.

19. An operation method of a communication processor, the method comprising:

maintaining a sleep state during a first period of time, and entering a discontinuous reception (DRX) mode for performing physical downlink control channel (PDCCH) monitoring during a second period of time, in response to failure of detection of transmission/reception permission associated with transmission data and/or reception data in a PDCCH during a designated period of time;

outputting information indicating that a state of the communication processor is the DRX mode, to the outside, in response to entry to the DRX mode;

changing the state of the communication processor from the DRX mode to an activated state, based on detection of transmission/reception permission associated with transmission data and/or reception data according to a result of performing PDCCH monitoring during the second period of time of a DRX; and outputting information indicating that the state of the communication processor is the activated state, to the outside.

20. The method of claim 19, wherein the information indicating that the state of the communication processor is the DRX mode or the information indicating that the state of the communication processor is the activated state is output periodically, or is output based on changing of the state of the communication processor.

* * * * *